United States Patent
Kawano et al.

(10) Patent No.: US 6,891,982 B2
(45) Date of Patent: May 10, 2005

(54) OPTICAL MODULATION DEVICE HAVING EXCELLENT ELECTRIC CHARACTERISTICS BY EFFECTIVELY RESTRICTING HEAT DRIFT

(75) Inventors: Kenji Kawano, Atsugi (JP); Toru Nakahira, Atsugi (JP); Seiji Uchida, Atsugi (JP); Masaya Nanami, Zama (JP); Yuji Sato, Atsugi (JP)

(73) Assignee: Anritsu Corporation, Tokyo (JP)

( * ) Notice: Subject to any disclaimer, the term of this patent is extended or adjusted under 35 U.S.C. 154(b) by 270 days.

(21) Appl. No.: 10/333,546

(22) PCT Filed: May 23, 2002

(86) PCT No.: PCT/JP02/05008

§ 371 (c)(1),
(2), (4) Date: Jan. 22, 2003

(87) PCT Pub. No.: WO02/097521

PCT Pub. Date: Dec. 5, 2002

(65) Prior Publication Data

US 2003/0174920 A1 Sep. 18, 2003

(30) Foreign Application Priority Data

May 25, 2001 (JP) ........................................ 2001-157357

(51) Int. Cl.[7] ............................ G02F 1/01; G02F 1/035; G02F 1/295; G02F 1/355
(52) U.S. Cl. ..................... 385/4; 385/1; 385/2; 385/4; 385/5; 385/6; 385/7; 385/8
(58) Field of Search ................... 385/1, 2, 3, 4, 385/5, 6, 7, 8, 14; 359/254

(56) References Cited

U.S. PATENT DOCUMENTS 5,004,313 A * 4/1991 Ty Tan et al. .................. 385/2
5,327,512 A * 7/1994 Penner et al. .................. 385/3
6,385,360 B1 * 5/2002 Kambe ......................... 385/14
6,400,490 B1 * 6/2002 Hosoi .......................... 359/254

FOREIGN PATENT DOCUMENTS

| EP | 0 644 449 A2 | 3/1995 |
|---|---|---|
| JP | 62-173428 A | 7/1987 |
| JP | 3-253815 A | 11/1991 |
| JP | 4-22485 B2 | 4/1992 |
| JP | 4-288518 A | 10/1992 |
| JP | 5-61009 A | 3/1993 |
| JP | 6-235891 A | 8/1994 |
| JP | 2728150 B2 | 12/1997 |
| JP | 10-3064 A | 1/1998 |
| JP | 2873203 B2 | 1/1999 |
| JP | 2000-56282 A | 2/2000 |

* cited by examiner

*Primary Examiner*—Frank G. Font
*Assistant Examiner*—Mary El-Shammaa
(74) *Attorney, Agent, or Firm*—Frishauf, Holtz, Goodman & Chick, P.C.

(57) ABSTRACT

An optical waveguide for guided an incident light is formed on a substrate having an electro-optic effect. A first buffer layer is formed to cover an upper surface of the substrate. A conductive film is formed above the first buffer layer. A center electrode and a ground electrode are formed for applying a voltage in order to induce an electric field in the optical waveguide. A second buffer layer is formed between the conductive film and at least one of the center electrode and the ground electrode. The conductive film is formed to be present on at least a part below the ground electrode. A light guided through the optical waveguide is modulated by changing a phase by a voltage applied to the optical waveguide. Thereby, a thermal drift can be effectively restricted so that an optical modulation device having excellent electric characteristics can be realized.

20 Claims, 12 Drawing Sheets

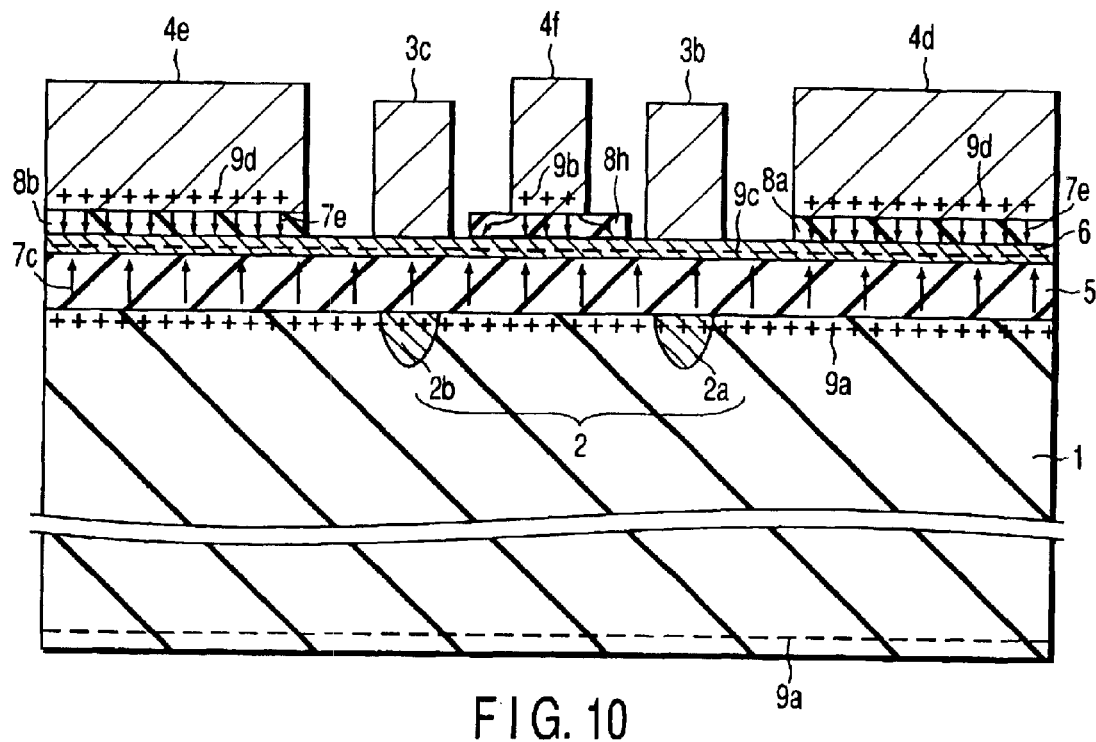
F I G. 10
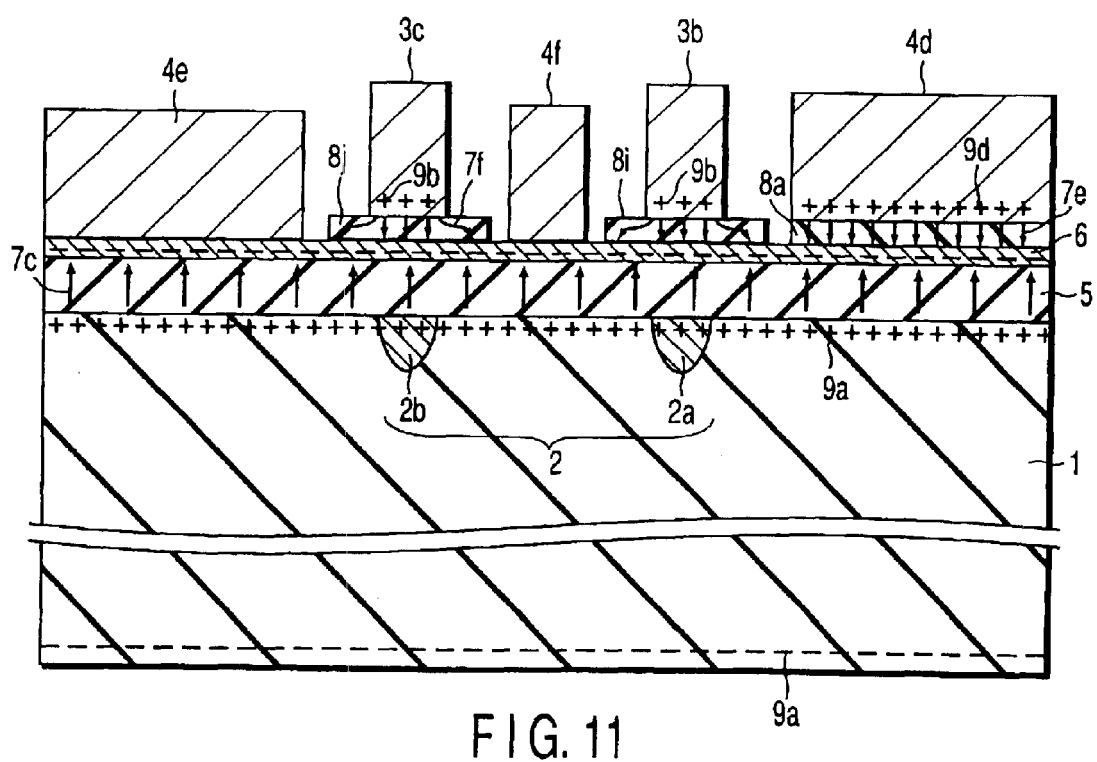
F I G. 11

US 6,891,982 B2

OPTICAL MODULATION DEVICE HAVING EXCELLENT ELECTRIC CHARACTERISTICS BY EFFECTIVELY RESTRICTING HEAT DRIFT

This application is a U.S. National Phase Application under 35 USC 371 of International Application PCT/JP02/05008 filed May 23, 2002.

TECHNICAL FIELD

The present invention relates to an optical modulation device and a method for manufacturing the same, and particularly to an optical modulation device for modulating an incident light using an electro-optic effect, and a method for manufacturing the same.

BACKGROUND ART

It is well known that materials such as lithium niobate ($LiNbO_3$) have an electro-optic effect by which a refractive index of a light is changed by applying an electric field.

A lithium niobate optical modulation device of a traveling wave electrode type (LN optical modulation device) configured by forming an optical waveguide and a traveling-wave electrode on a substrate made of such a material (hereinafter, abbreviated as an LN substrate) is used in high volume optical transmission systems of 2.5 Gbit/s and 10 Gbit/s because of its good chirping characteristics.

In recent years, as this LN optical modulation device is to be further applied to an optical transmission system having a very high capacity of 40 Gbit/s, the device needs to be further developed in light of its importance in the field of optical communications.

FIG. 18 is a perspective view showing a schematic configuration of a typical optical modulation device using lithium niobate ($LiNbO_3$).

Further, FIG. 19 is a sectional view of the optical modulation device in FIG. 18 taken along the line 19—19.

In FIG. 18 and FIG. 19, an optical waveguide 2 is formed from one end of an LN substrate 1 to the other end thereof in contact with an upper surface of the LN substrate 1 in the z-cut state where the lithium niobate ($LiNbO_3$) is cut in the z-surface direction of a crystal surface.

The optical waveguide 2 is branched into two optical waveguides 2a and 2b at the midpoint of the LN substrate 1, which are brought together again in the vicinity of the other end.

A buffer layer 5 commonly covering the upper surfaces of these optical waveguides 2a and 2b and the upper surface of the LN substrate 1 is formed.

A center electrode 3 is formed at a position opposite to the one optical waveguide 2a in the upper surface of the buffer layer 5.

Further, in the upper surface of the buffer layer 5, ground electrodes 4a and 4b are formed, respectively, at the position not opposite to the one optical waveguide 2a and at the position opposite to the other optical waveguide 2b so as to sandwich the center electrode 3.

The discussion here can be applied to any traveling-wave electrode in any form, but as one example, it is assumed that a coplanar waveguide (CPW) having one center electrode 3 and two ground electrodes 4a, 4b is employed.

Furthermore, the optical waveguides 2, 2a, 2b are so-called thermal diffusion optical waveguides formed by, after depositing a metal titanium (Ti) in the thickness from several tens nm to 100 nm or more, patterning it in the width in the order of 6 to 8 $\mu$m, and further thermally diffusing it at a temperature of about 1000° C.

In the optical modulation device shown in FIG. 18 and FIG. 19, the optical waveguides 2, 2a, and 2b as a Mach-Zehnder interferometer are configured.

In addition, a one-linear optical waveguide may be employed instead of the Mach-Zehnder interferometer in the case of a phase modulation device.

The buffer layer 5 is deposited between the traveling-wave electrode formed of the center electrode 3 and the ground electrodes 4a, 4b and the LN substrate 1 in order to restrict an absorption loss which a light guided through the optical waveguides 2a and 2b receives from the metal (Au is generally employed) which is the traveling-wave electrode (center electrode 3, ground electrodes 4a, 4b).

The buffer layer 5 is generally made of $SiO_2$ which is as thick as about 1 $\mu$m.

The buffer layer 5 is used for reducing a microwave equivalent refractive index of an electric signal guided through the traveling-wave electrode formed of the center electrode 3 and the ground electrodes 4a, 4b (or microwave equivalent refractive index of the traveling-wave electrode) to be made closer to an equivalent refractive index of the light guided through the optical waveguides 2a and 2b (or equivalent refractive index of the optical waveguide), and making a characteristic impedance closer to 50 Ω, as well as for restricting the absorption loss.

FIG. 20 is a diagram shown for explaining operations of the optical modulation device having such a structure.

In other words, FIG. 20 shows a desirable distribution of an electric line of force 7a in the case where a voltage is applied between the center electrode 3 and the ground electrodes 4a, 4b of the traveling-wave electrode.

As can be understood from FIG. 20, since the orientation of the electric line of force 7a across the two optical waveguides 2a and 2b is reverse to the orientation of both the optical waveguides, a phase of the light guided through the two optical waveguides 2a and 2b is shifted by 180° ($\pi$) in the optical waveguide of the Mach-Zehnder interferometer so that the OFF state of the light can be realized.

However, even an optical modulation device having a sectional structure shown in FIG. 19 still has disadvantages, as described below.

Since the LN substrate 1 has a pyroelectric effect, as shown in FIG. 21, when the temperature of the LN substrate 1 is changed, a charge 9a is induced on the surface thereof.

However, since the buffer layer 5 made of $SiO_2$ does not have conductivity, in the center electrode 3 and the ground electrodes 4a, 4b of the traveling-wave electrode, a charge 9b having a polarity opposite to the polarity of the charge 9a induced on the surface of the LN substrate 1 is induced on the surface opposite the LN substrate 1 through an external circuit.

As a result, an electric line of force 7b is generated between the charge 9a induced on the LN substrate 1 and the charge 9b induced on the center electrode 3 and the ground electrodes 4a, 4b of the traveling-wave electrode.

However, as can be understood from FIG. 21, since this electric line of force 7b is generated at random, the electric line of force 7a generated by the voltage applied between the center electrode 3 and the ground electrodes 4a, 4b for operating the optical modulation device is eliminated at random.

Therefore, the optical modulation efficiency of the optical modulation device widely varies, due to changes in temperature.

The change of this optical modulation efficiency occurs as a phenomenon of an operating point shift.

This operating point shift due to the temperature is called thermal drift.

In order to solve the disadvantages of the aforementioned optical modulation device, there has been proposed an optical modulation device having a sectional shape shown in FIG. 22 (refer to Jpn. Pat. Appln. KOKOKU Publication No. 4-22485).

In addition, in FIG. 22, the diagram is shown in a somewhat enlarged manner in the vertical direction in order to explain the operations.

Further, in the optical modulation device shown in FIG. 22, like reference numerals are denoted to like parts identical to those in the optical modulation device shown in FIG. 19.

Furthermore, a perspective view showing the entire structure of the optical modulation device shown in FIG. 22 is substantially identical to the perspective view of the optical modulation device shown in FIG. 18.

In the optical modulation device shown in FIG. 22, a conductive film 6 is formed on the upper side of the buffer layer 5, and the center electrode 3 and the ground electrodes 4a, 4b are formed on the upper side of the conductive film 6.

In other words, as shown in FIG. 22, a charge 9c having a polarity opposite the polarity of the charge 9a induced on the LN substrate 1 due to the pyroelectric effect of the LN substrate 1 is induced on the conductive film 6 in contact with the center electrode 3 and the ground electrodes 4a, 4b.

As a result, an electric line of force 7c between the charge 9a induced on the LN substrate 1 and the charge 9c induced on the conductive film 6 becomes uniform as shown in FIG. 22 so that a random electric line of force is not across the optical waveguides 2a and 2b.

This is to say, the changes of the refractive index caused by the charge 9a induced by the pyroelectric effect become the same in the two optical waveguides 2a and 2b.

Thereby, in the optical modulation device shown in FIG. 22, the phase difference of the lights being guided through the two optical waveguides 2a and 2b is caused by only the voltage externally applied, which enables this device to function as an optical modulation device.

In addition, an Si film having the thickness of about 100 nm is employed as the conductive film 6.

However, even an optical modulation device employing the conductive film 6 in this manner still has important problems to be solved.

That is, as is well known, the control of the electric conductivity of the conductive film 6 is very difficult, which means that the conductivity thereof easily varies, in the order of 2 to 3 decimal places, due to impurities in the film.

When the conductivity of the conductive film 6 is too low, the device closely resembles an optical modulation device which does not employ a conductive film 6 shown in FIG. 19, meaning that the problems which this optical modulation device has occurs.

On the contrary, when the conductivity of the conductive film 6 is too high, the center electrode 3 and the ground electrodes 4a, 4b enter an electrically conductive state.

As a result, the characteristic impedance of the traveling-wave electrode formed of the center electrode 3 and the ground electrodes 4a, 4b is very lowered, thus the electric characteristics and high frequency characteristics are deteriorated, or a large current flows between the center electrode 3 and the ground electrodes 4a, 4b, so that the device itself is destroyed.

In this manner, it is remarkably difficult to form a conductive film 6 having an appropriate conductivity with excellent reproducibility, and the optical modulation device employing the conductive film 6 shown in FIG. 22 has a large problem in the reproducibility in the manufacture thereof.

In order to solve the disadvantages of the aforementioned optical modulation device, there has been further proposed an optical modulation device having a sectional shape shown in FIG. 23 (Japanese Patent No. 2873203).

In the optical modulation device shown in FIG. 23, like reference numerals are denoted to like parts identical to those in the optical modulation device shown in FIG. 19.

In the optical modulation device shown in FIG. 23, the width of the conductive film 6a is set to be finite so that the conductive film 6a is made to contact only the center electrode 3.

Further, in the optical modulation device shown in FIG. 23, a configuration is employed in which a gap 10, having a width G, is provided between the ground electrodes 4a, 4b at both sides, and a conductive film 6a, so that the ground electrodes 4a, 4b and the conductive film 6a do not contact.

Next, operations of the optical modulation device in which the width of the conductive film 6a is restricted in this manner are described.

With respect to the electric field applied to the optical waveguide 2a positioned below the center electrode 3, an electric line of force 7d caused by the uniform electric field distribution can be obtained by the same principles as the optical modulation device shown in FIG. 22 other than the influence of the electric field from the charge 9a induced by the pyroelectric effect in an area A and an area B in FIG. 23 due to the presence of the conductive film 6a.

On the other hand, with respect to the ground electrodes 4a and 4b, the ground electrodes 4a and 4b are not in contact with the conductive film 6a different from the optical modulation device shown in FIG. 22.

Therefore, with respect to the optical waveguide 2b positioned in the area B in FIG. 23, it is predicted that the problem similar to that of the optical modulation device shown in FIG. 19 occurs.

In order to avoid that, the following devisal is made.

The thickness of the traveling waveguide of the center electrode 3 and the ground electrodes 4a, 4b is set to be as thick as several $\mu$m or more.

In other words, since the traveling-wave electrode made of metal (Au is generally used as a material, but various other meals such as aluminum, copper, and the like can be employed) and the LN substrate 1 of dielectrics have different thermal expansion coefficients, a temperature-dependent stress is generated in the LN substrate 1.

The internal stress due to plating becomes larger to the extent where a bow occurs in the LN substrate 1 when plating is performed to several $\mu$m or more.

The internal electric field occurs due to the photoelastic effect caused by this internal stress.

On the other hand, as described in the optical modulation device shown in FIG. 19, the charge 9a occurs in the surface of the LN substrate 1 by the pyroelectric effect when the temperature is changed such that the internal electric field occurs.

In the optical modulation device shown in FIG. 23, the gap 10 having the width G is provided between the conductive film 6a and the ground electrodes 4a, 4b at both sides and the width G is defined by photolithography. Therefore, the internal electric field by the photoelastic effect caused by the internal stress and the internal electric field by the pyroelectric effect caused by the temperature change are eliminated.

Accordingly, in the state where the characteristic impedance of the traveling-wave electrode formed of the center electrode 3 and the ground electrodes 4a, 4b is maintained in a constant state, it is prevented that the electric line of force 7a due to the voltage applied between the center electrode 3 and the ground electrodes 4a, 4b for operating the optical modulation device is eliminated at random.

However, even an optical modulation device in which the width of the conductive film 6a is restricted shown in FIG. 23 has the following further problem to be solved.

In other words, as can be easily assumed from the above description, it is not easy to appropriately eliminate the two internal electric fields described above generated in the LN substrate 1.

Further, when it cannot be realized, a random electric field is applied in the optical waveguide 2b positioned below the ground electrode 4b as with the optical modulation device shown in FIG. 19.

Particularly, the influence of the random electric field from the area A is large.

In addition, the random electric field from the area B particularly acts on the optical waveguide 2a below the center electrode 3.

As a result, the operating point in the optical modulation of the optical modulation device is largely deviates according to the temperature.

The traveling-wave electrode formed of the center electrode 3 and the ground electrodes 4a, 4b is generally formed by electrolytic plating method, but since a temperature variation or a current variation is present in the electrolytic plating solution, even when the same current is flowed at the same solution temperature at the time of plating, a slight variation occurs in the particle of the grown plating or the thickness of the electrode every run-to-run of the plating step.

Therefore, the internal stress caused by the formed plating is different in every plating.

Furthermore, in the electrolytic plating solution, a slight variation is present in the particles of the plating or the thickness of the electrode even in the same wafer, because of the fact that a variation is present in the current or the solution temperature between the plating electrode and the wafer, and the convection of the electrolytic plating solution, so that the internal stress is different in every chip.

As a result, it is difficult to determine the appropriate width G of the gap 10 for eliminating the internal electric field caused by the photoelastic effect due to the thermal stress and the internal electric field caused by the pyroelectric effect due to the temperature change.

Additionally, since the gap 10 is realized by photolithography, it is required to be performed before plating the traveling-wave electrode to 10 μm or more.

That is, the gap 10 is required to be formed at the stage where each modulation device including the LN substrate 1 is cut out from the wafer, namely in the wafer stage.

As a result, it has to be performed before measuring the thermal drift characteristics of each modulation device, and the determination of the width G of the gap 10 is difficult and is not necessarily appropriately performed with respect to each chip so that a yield of the optical modulation device including the LN substrate 1 is restricted.

Moreover, as described above, the effect obtained by eliminating the two electric fields described above generated in the LN substrate 1 is limited, and therefore the thickness of the plating of the traveling-wave electrode is limited to about 10 to 20 μm.

However, in the actual optical modulation device, in order to achieve a velocity matching between a microwave and a light required for broadbandizing of the optical modulation, sometimes the traveling-wave having the thickness of 25 μm to 30 μm or more may be required.

In this case, the optical modulation device having a mechanism for eliminating the two internal electric fields shown in FIG. 23 cannot be used and application has limitation.

DISCLOSURE OF INVENTION

The present invention is made in view of the above circumstances, and it is an object of the present invention to provide a small-sized and high-speed optical modulation device in which a conductive film is employed and a center electrode and a ground electrode are electrically separated, so that an electrical resistance between the center electrode and the ground electrode is made larger, device destruction is avoided, and excellent high frequency characteristics are attained, facilitation of structure determination or manufacturing process or reproducibility of manufacture is secure, and further, thermal drift is effectively restricted also for a traveling-wave electrode (center electrode and ground electrode) having the thickness of 20 μm or more generally required, and as a result, an operating point shift caused by thermal drift is small.

It is another object of the present invention to provide a method for manufacturing a small-sized and high-speed optical modulation device in which a conductive film is employed and a center electrode and a ground electrode are electrically separated so that an electrical resistance between the center electrode and the ground electrode is made larger, device destruction is avoided and excellent high frequency characteristics are attained, facilitation of structure determination or manufacturing process or reproducibility of manufacture is secure, and further, thermal drift is effectively restricted also for a traveling-wave electrode (center electrode and ground electrode) having the thickness of 20 μm or more generally required, and as a result, an operating point shift caused by thermal drift is small.

In order to achieve the above object, according to a first aspect of the present invention, there is provided an optical modulation device comprising:

a substrate (1) having an electro-optic effect;

an optical waveguide (2) which is formed on the substrate and guides an incident light;

a first buffer layer (5) which covers an upper surface of the substrate;

a conductive film (6) formed above the first buffer layer;

a center electrode (3) and a ground electrode (4) to apply a voltage in order to induce an electric field on the optical waveguide; and a second buffer layer (8) formed between the conductive film and at least one of the center electrode and the ground electrode, wherein the conductive film is formed to be present on at least a part below the ground electrode, and a light guided through the optical waveguide is modulated by changing a phase by a voltage applied to the optical waveguide.

In order to achieve the above object, according to a second aspect of the present invention, there is provided an optical modulation device according to the first aspect, wherein the center electrode is in contact with the conductive film and the ground electrode is not in contact with the conductive film.

In order to achieve the above object, according to a third aspect of the present invention, there is provided an optical modulation device according to the first or second aspect, wherein a second buffer layer is formed between the ground electrode and the conductive film.

In order to achieve the above object, according to a fourth aspect of the present invention, there is provided an optical modulation device according to the first aspect, wherein the ground electrode is in contact with the conductive film and the center electrode is not in contact with the conductive film.

In order to achieve the above object, according to a fifth aspect of the present invention, there is provided an optical modulation device according to the first or fourth aspect, wherein a second buffer layer is formed between the center electrode and the conductive film.

In order to achieve the above object, according to a sixth aspect of the present invention, there is provided an optical modulation device according to the first aspect, wherein the center electrode includes a plurality of center electrode members, at least one of the plurality of center electrode members is in contact with the conductive film, and the ground electrode is not in contact with the conductive film.

In order to achieve the above object, according to a seventh aspect of the present invention, there is provided an optical modulation device according to the first aspect, wherein the center electrode includes a plurality of center, electrode members, all the plurality of center electrode members are in contact with the conductive film, and the ground electrode is not in contact with the conductive film.

In order to achieve the above object, according to an eighth aspect of the present invention, there is provided an optical modulation device according to the sixth or seventh aspect, wherein a second buffer layer is formed between the ground electrode and the conductive film.

In order to achieve the above object, according to a ninth aspect of the present invention, there is provided an optical modulation device according to the first aspect, wherein the ground electrode includes a plurality of ground electrode members, at least one of the plurality of ground electrode members is in contact with the conductive film, and the center electrode is not in contact with the conductive film.

In order to achieve the above object, according to a tenth aspect of the present invention, there is provided an optical modulation device according to the ninth aspect, wherein a second buffer layer is formed between the center electrode and the conductive film.

In order to achieve the above object, according to an eleventh aspect of the present invention, there is provided an optical modulation device according to the first aspect, wherein a second buffer layer is formed between the center electrode, the ground electrode and the conductive film, the center electrode and the ground electrode are not in contact with the conductive film, and part of the conductive film is electrically connected with the outside.

In order to achieve the above object, according to a twelfth aspect of the present invention, there is provided an optical modulation device according to the eleventh aspect, wherein the center electrode includes a plurality of center electrode members.

In order to achieve the above object, according to a thirteenth aspect of the present invention, there is provided an optical modulation device according to the eleventh aspect, wherein the ground electrode includes a plurality of ground electrode members.

In order to achieve the above object, according to a fourteenth aspect of the present invention, there is provided n optical modulation device according to the first aspect, wherein the center electrode includes a plurality of center electrode members and the ground electrode includes a plurality of ground electrode members, at least one of the plurality of center electrode members is in contact with the conductive film, at least one of the plurality of ground electrode members is in contact with the conductive film, and the at least one of the plurality of center electrodes or the at least one of the plurality of ground electrodes is not in contact with the conductive film.

In order to achieve the above object, according to a fifteenth aspect of the present invention, there is provided an optical modulation device according to the ninth or tenth aspect, wherein only part of the ground electrode is in contact with the conductive film.

In order to achieve the above object, according to a sixteenth aspect of the present invention, there is provided a method for manufacturing an optical modulation device, comprising:

providing a substrate (1) having an electro-optic effect;

forming an optical waveguide (2) which guides an incident light on the substrate;

forming a first buffer layer (5) which covers an upper surface of the substrate;

forming a conductive film (6) above the first buffer layer;

forming a center electrode (3) and a ground electrode (4) which apply a voltage in order to induce an electric field on the optical waveguide; and forming a second buffer layer (8) between the conductive film and at least one of the center electrode and the ground electrode, wherein the conductive film is formed to be present on at least a part below the ground electrode, and a light guided through the optical waveguide is modulated by changing a phase by a voltage applied to the optical waveguide.

In the optical modulation device configured in this manner, a charge having the polarity opposite to the polarity of a charge to be induced on a surface of the substrate having an electro-optic effect by a pyroelectric effect is induced on the conductive film via a traveling-wave electrode formed of the canter electrode and the ground electrodes from an external circuit when a temperature is changed.

As a result, in the optical modulation device, an electric field by induced mutual charges becomes uniform in an area where the optical waveguide is present so that an operating point shift due to the thermal drift is finally restricted without influencing the optical modulation.

Further, in the optical modulation device, since the center electrode and the ground electrode configuring the traveling-wave electrode are electrically separated, even when the conductivity of the conductive film for restricting the thermal drift due to the pyroelectric effect becomes larger, excellent electric characteristics, including high frequency characteristics can be attained.

BRIEF DESCRIPTION OF DRAWINGS

FIG. 10 is a schematic sectional view showing a schematic configuration of an optical modulation device according to a tenth embodiment;

FIG. 11 is a schematic sectional view showing a schematic configuration of an optical modulation device according to a eleventh embodiment;

BEST MODE FOR CARRYING OUT THE INVENTION

Hereinafter, respective embodiments according to the present invention will be described with reference to the drawings.

(First Embodiment)

Figure 1:
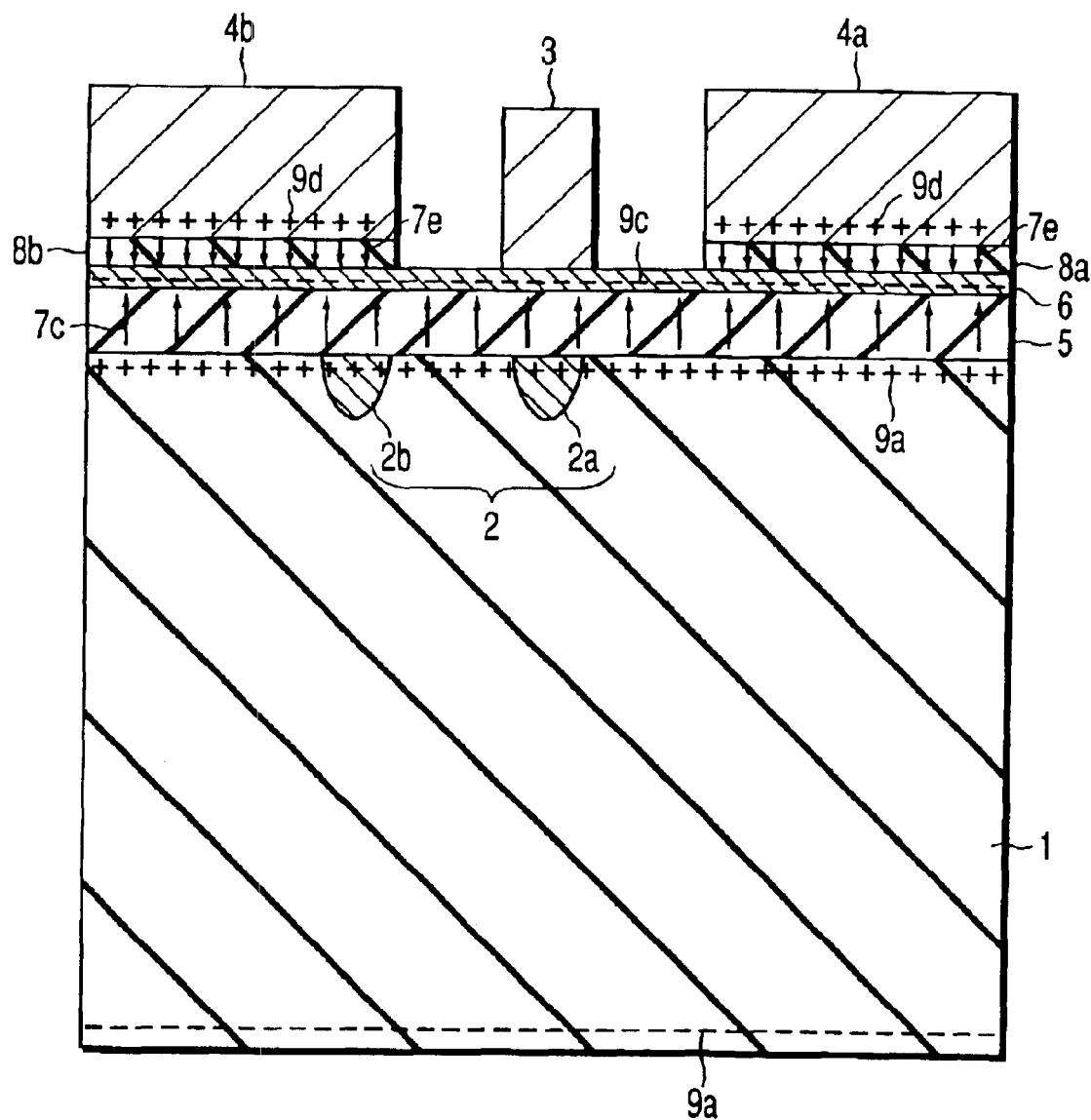
FIG. 1 is a schematic sectional view showing a schematic configuration of an optical modulation device according to a first embodiment.

FIG. 1 is a schematic sectional view showing a schematic configuration of an optical modulation device according to a first embodiment of the present invention.

The optical modulation device shown in FIG. 1 is somewhat enlarged in the vertical direction in order to simplify the description.

Figure 22:
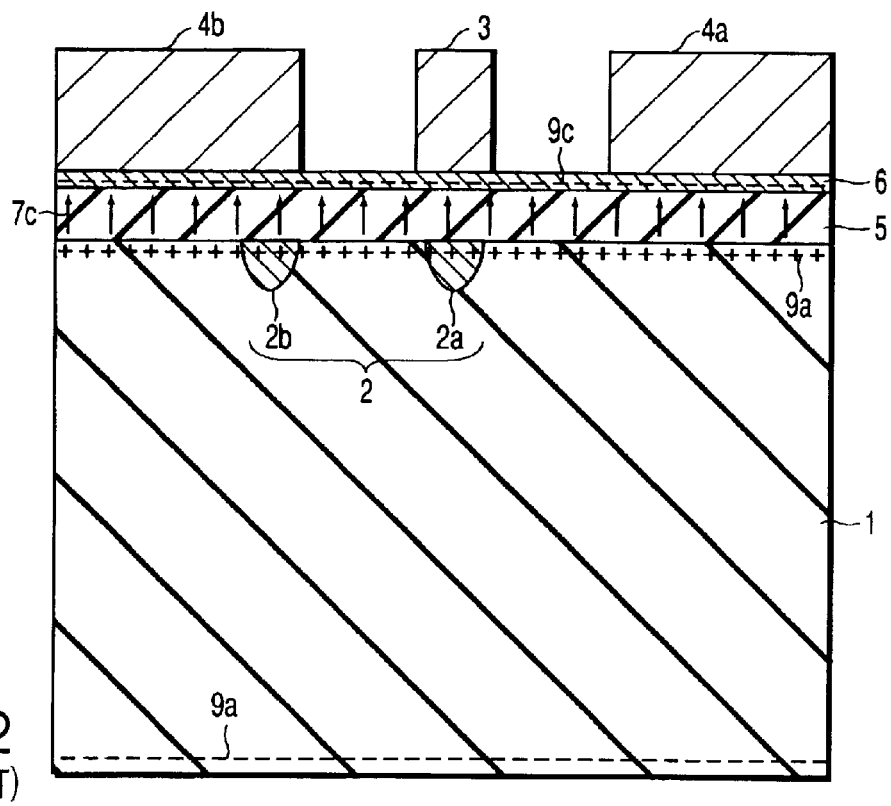
FIG. 22 is a schematic sectional view showing a schematic configuration of another conventional optical modulation device.

Further, in the optical modulation device shown in FIG. 1, like reference numerals are denoted to like parts identical to those in the conventional optical modulation device shown in FIG. 22, and detailed description of the overlapping parts will be omitted.

Figure 18:
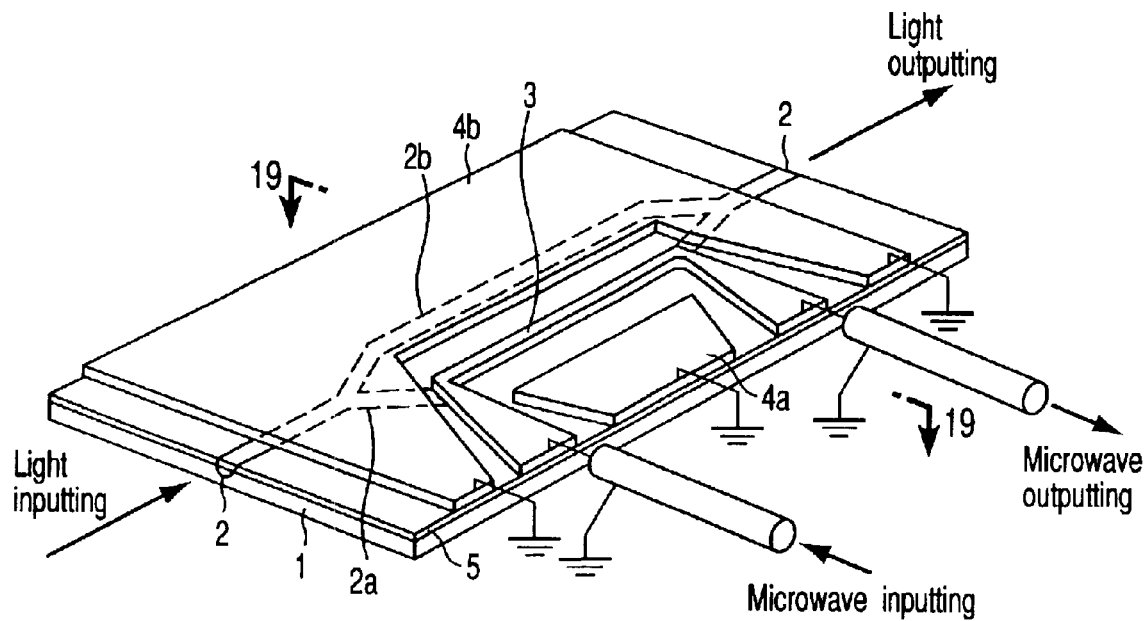
FIG. 18 is a perspective view showing a schematic configuration of a conventional typical optical modulation device.
Figure 19:
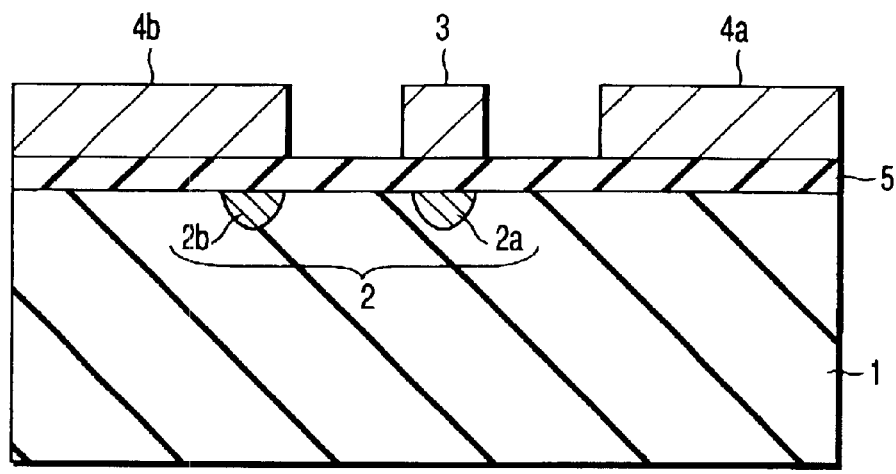
FIG. 19 is a schematic sectional view showing a schematic configuration of a conventional optical modulation device.
Figure 20:
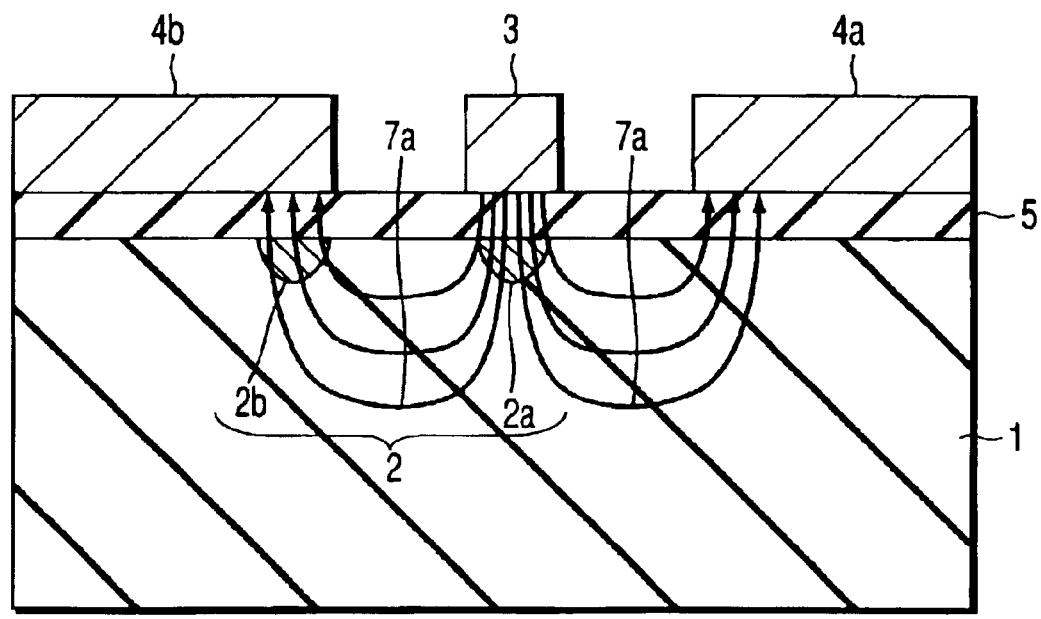
FIG. 20 is a diagram for explaining operations of the conventional optical modulation device.
Figure 21:
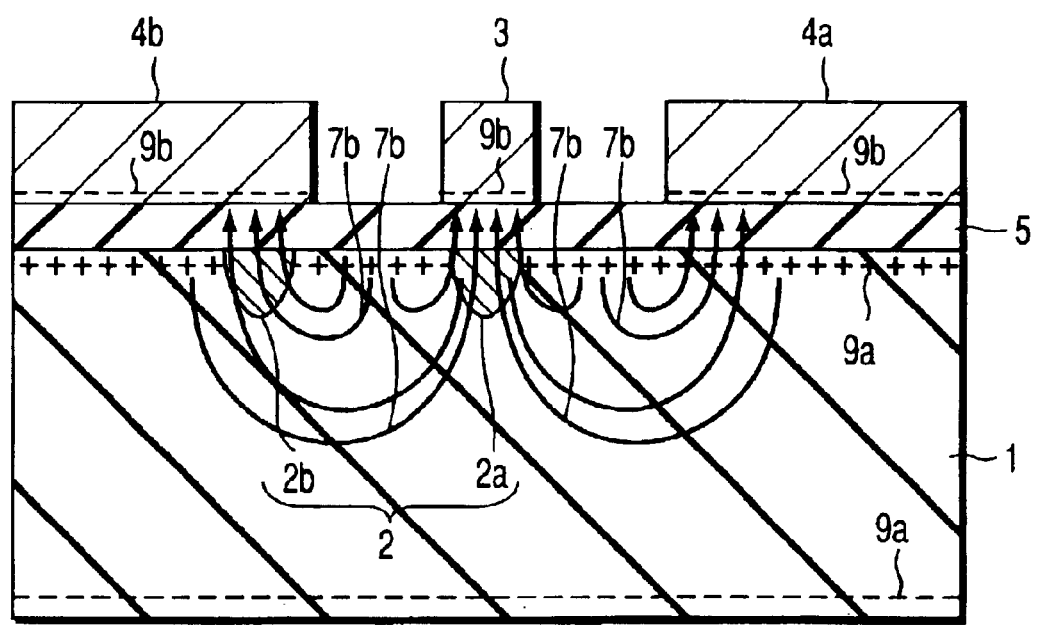
FIG. 21 is a diagram for explaining a problem of the conventional optical modulation device.

A perspective view showing the entire structure of the optical modulation device shown in FIG. 1 is substantially the same as the perspective view of the conventional optical modulation device shown in FIG. 18.

In other words, in the optical modulation device according to the first embodiment of the present invention, as shown in FIG. 1, an optical waveguide 2 is formed from one end of a LN substrate 1 to the other end in contact with the upper surface in the LN substrate 1 in the Z-cut state.

The optical waveguide 2 is branched into two optical waveguides 2a and 2b at the midpoint of the LN substrate 1, which are brought together again in the vicinity of the other end.

A buffer layer 5 is formed so as to cover the upper surfaces of these optical waveguides 2a, 2b and the upper surface of the LN substrate 1.

A conductive film 6 is formed at the upper surface of the buffer layer 5.

Further, a center electrode 3 is formed at the position opposite to the one optical waveguide 2a in the upper surface of the conductive film 6.

Furthermore, second insulating buffer layers 8a and 8b are formed, respectively, at the position not opposite to the one optical waveguide 2a and at the position opposite to the other optical waveguide 2b so as to sandwich the center electrode 3.

Ground electrodes 4a and 4b are formed on the second buffer layers 8a and 8b, respectively.

Specifically, in the optical modulation device according to this first embodiment, the center electrode 3 and the conductive film 6 are in contact as with the conventional optical modulation device shown in FIG. 22.

The ground electrodes 4a and 4b are not in contact with the conductive film 6 different from the conventional optical modulation device shown in FIG. 22.

Further, in the optical modulation device according to this first embodiment, since the conductive film 6 is entirely formed across the substrate surface direction, a gap 10 is not present and the conductive film 6 is present below the ground electrodes 4a and 4b different form the conventional optical modulation device shown in FIG. 23.

Next, a procedure of manufacturing the optical modulation device according to the first embodiment will be described.

In the optical modulation device according to the first embodiment, the Ti thermal diffusion optical waveguides 2a and 2b are formed on the Z-cut LN substrate 1 as with the conventional optical modulation device shown in FIG. 22.

Next, the buffer layer 5 made of $SiO_2$ having the thickness in the order of several tens nm to 1 µm is deposited on the LN substrate 1 by sputtering or the like.

Thereafter, the Si film having the thickness of about 100 nm is formed as the conductive film 6 on the buffer layer 5.

Then, in order to electrically separate each ground electrode 4a, 4b and the conductive film 6, insulation layers for forming the second buffer layers made of $SiO_2$ film having a thickness on the order of several tens nm to 1 $\mu$m are deposited on the conductive film 6.

Subsequently, the $SiO_2$ film other than the portions under the ground electrodes 4a and 4b to be formed later is removed by dry etching, wet etching, or the like.

Thereby, the second buffer layers 8a and 8b are formed, respectively, at the portions under the ground electrodes 4a and 4b.

At this time, an area where the buffer layer is not partially present is present, where the conductive film 6 is exposed on the surface.

Further, after Ti and Au are deposited on the entire surface, a photo resist is formed for plating-growing the center electrode 3 and the ground electrodes 4a, 4b.

Next, after Au having the thickness of about 3 $\mu$m to 40 $\mu$m is grown by the electrolytic plating method according to a desired optical modulation band, the photo resist is removed by acetone or the like.

Thereafter, unnecessary Ti and Au are removed by dry etching or wet etching.

Then, operations of the optical modulation device according to the first embodiment will be described.

When the temperature of the LN substrate 1 rises, a charge 9a is induced on the surface of the LN substrate 1 by the pyroelectric effect.

In the first embodiment, since the center electrode 3 and the conductive film 6 are in contact, a charge 9c having the polarity opposite to the polarity of the charge 9a induced on the surface of the LN substrate 1 is induced on the conductive film 6 through the center electrode 3 from the external circuit.

The conductive film 6 is present not only under the center electrode 3 but also under the ground electrodes 4a and 4b.

Therefore, an electric line of force 7c by the electric field generated between the charge 9a induced on the surface of the LN substrate 1 and the charge 9c induced on the conductive film 6 is uniform in the areas where the optical waveguides 2a and 2b are present so that the same refractive index change, that is, the same phase change is caused for the two optical waveguides 2a and 2b.

Since the intensity modulation according to the phase difference between the lights guided through the two optical waveguides 2a and 2b is generated in the Mach-Zehnder interferometer, even when the lights guided through the two optical waveguides 2a and 2b generate the phase change with the same amount, this fact does not influence the wave combining.

Further, a charge 9d having the polarity opposite to that of the charge 9c induced on the conductive film 6 is induced on the ground electrodes 4a and 4b which are formed on the second insulating buffer layers 8a and 8b made of $SiO_2$ through the external circuit.

However, an electric line of force 7e caused by both the induced charges 9c and 9d is limited between the ground electrodes 4a, 4b and the conductive film 6 and is not across the optical waveguides 2a and 2b so that the optical modulation efficiency is not influenced.

It is better in manufacture that the second buffer layers 8a and 8b positioned at the lower sides of the ground electrodes 4a and 4b are extended between the center electrode 3 and the ground electrodes 4a, 4b at both sides, which does not cause any problems.

(Second Embodiment)

Figure 2:
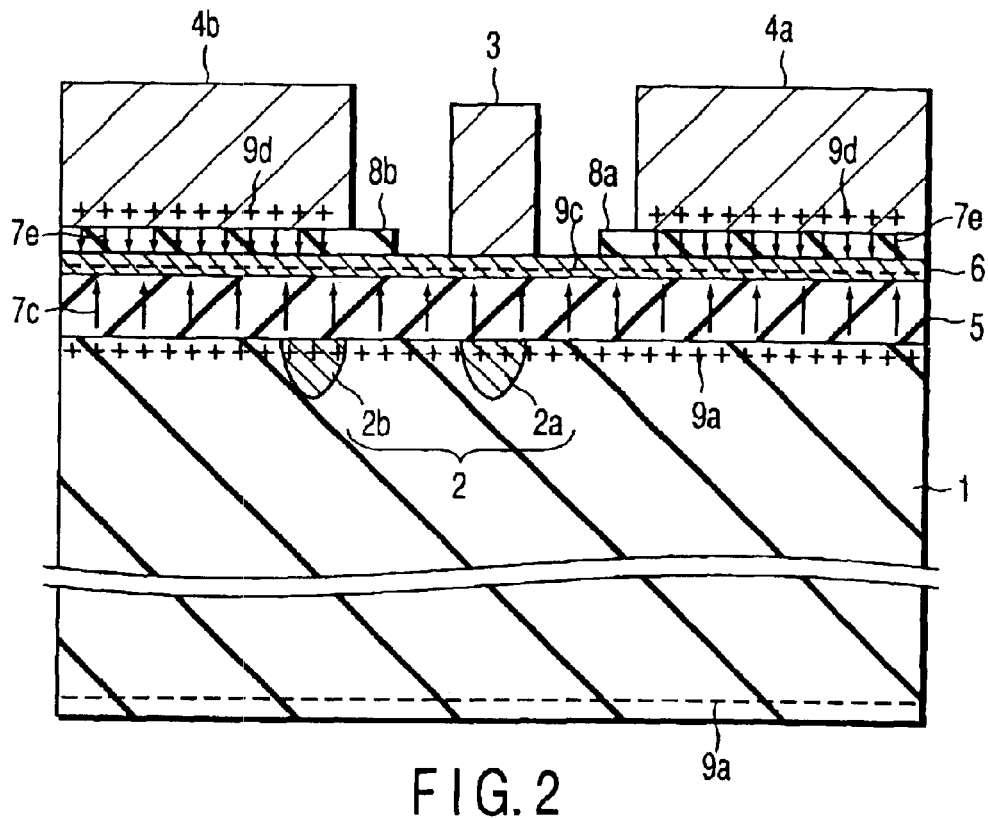
FIG. 2 is a schematic sectional view showing a schematic configuration of an optical modulation device according to a second embodiment.

FIG. 2 is a schematic sectional view showing a schematic configuration of an optical modulation device according to a second embodiment of the present invention.

In the optical modulation device according to the second embodiment shown in FIG. 2, like reference numerals are denoted to like parts identical to those in the optical modulation device according to the first embodiment shown in FIG. 1, and detailed description of the overlapping parts will be omitted.

In the optical modulation device according to this second embodiment, the second buffer layers 8a and 8b positioned at the lower sides of the two ground electrodes 4a and 4b in the optical modulation device according to the first embodiment shown in FIG. 1 are extended to the center electrode 3 side.

In this case, it goes without saying that, with respect to only one ground electrode 4a (4b), the second buffer layer 8a (8b) may be extended to the center electrode side 3.

In this case, edges of the second buffer layers 8a and 8b may be etched in order that the edge of at least one of the second buffer layers 8a and 8b is retreated in the ground electrode 4a, 4b side.

As described above, according to the optical modulation devices of the first and second embodiments, the thermal drift of the optical modulation by the pyroelectric effect can be effectively restricted.

Figure 23:
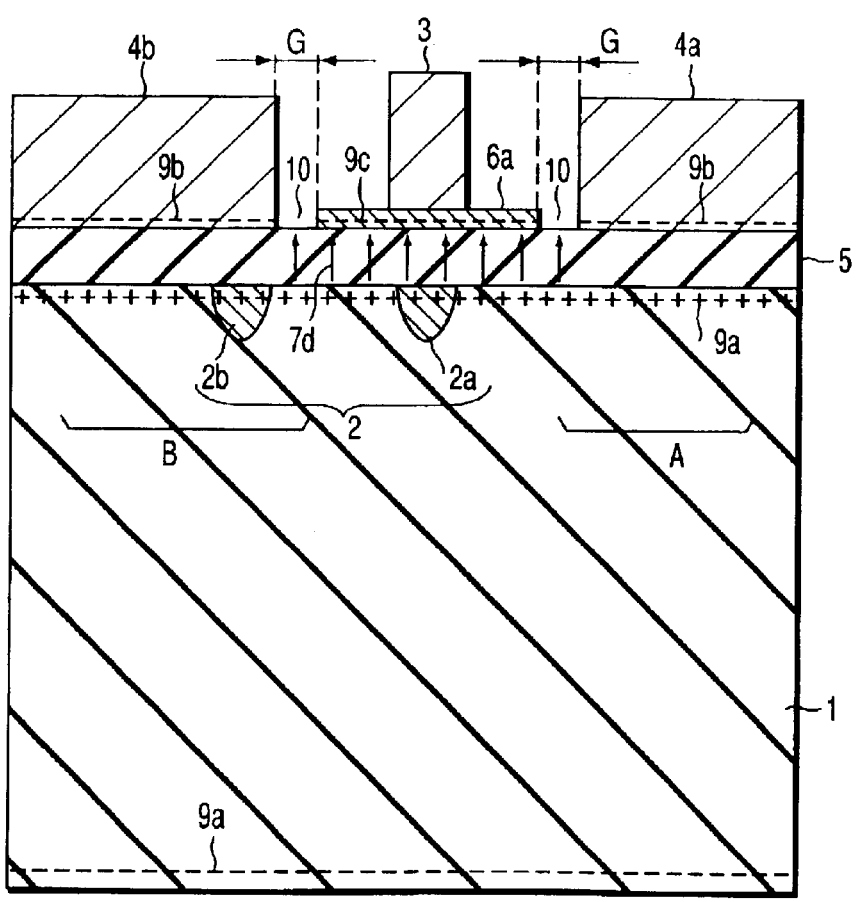
FIG. 23 is a schematic sectional view showing a schematic configuration of still another conventional optical modulation device.

Furthermore, according to the optical modulation devices of the first and second embodiments, the conductive film 6 is formed not only at the center electrode 3 but also at the areas of the ground electrodes 4a and 4b so that the effect of the thermal drift restriction is remarkable as compared with the conventional optical modulation device shown in FIG. 23.

Additionally, in the conventional optical modulation device shown in FIG. 22, both the center electrode 3 and the ground electrodes 4a, 4b are in contact with the conductive film 6 so that the conductivity of the conductive film 6 largely influences the electric characteristics as the traveling-wave electrode and can occasionally cause device destruction. However, in the optical modulation devices according to the first and second embodiments, the ground electrodes 4a and 4b are not is contact with the conductive film 6 and the center electrode 3 and the ground electrodes 4a, 4b are electrically separated completely. Accordingly, there is the advantage that the device destruction does not occur and the conductivity of the conductive film 6 is not easy to influence the electric characteristics as the traveling-wave electrode.

(Third Embodiment)

Figure 3:
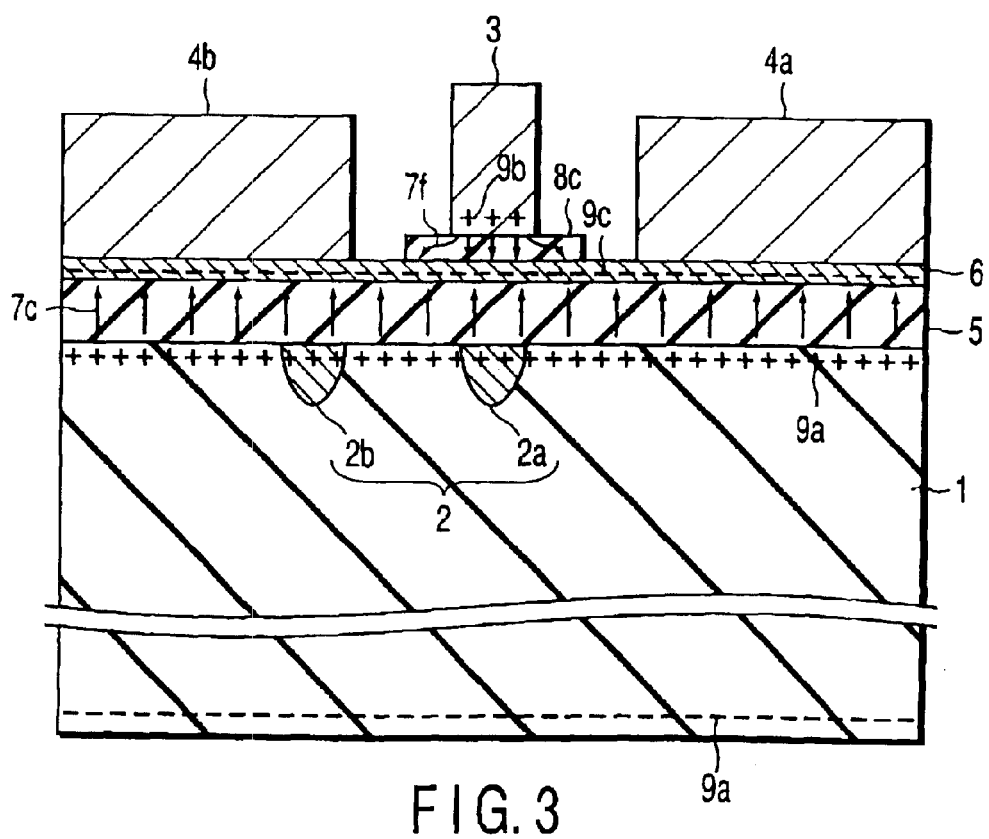
FIG. 3 is a schematic sectional view showing a schematic configuration of an optical modulation device according to a third embodiment.

FIG. 3 is a schematic sectional view showing a schematic configuration of an optical modulation device according to a third embodiment of the present invention.

In the optical modulation device according to the third embodiment shown in FIG. 3, like reference numerals are denoted to like parts identical to those in the conventional optical modulation device shown in FIG. 22, and detailed description of the overlapping parts will be omitted.

In the optical modulation device according to this third embodiment, the ground electrodes 4a, 4b and the conductive film 6 are in contact as with the conventional optical modulation device shown in FIG. 22.

However, in the optical modulation device according to the third embodiment, a second insulating buffer layer 8c is formed on the center portion of the upper surface of the conductive film 6, and the center electrode 3 is formed on the second buffer layer 8c.

As a result, in the optical modulation device according to the third embodiment, the center electrode 3 and the conductive film 6 are not in contact different from the conventional optical modulation device shown in FIG. 22.

Now, operations of the optical modulation device according to the third embodiment will be described with reference to FIG. 3.

When the temperature of the LN substrate 1 rises, a charge 9a is induced on the surface of the LN substrate 1 by the pyroelectric effect.

In the present embodiment, since the ground felectrodes 4a, 4b and the conductive film 6 are in contact, a charge 9c having a polarity opposite to the polarity of the charge 9a induced on the surface of the LN substrate 1 is induced on the conductive film 6 through the ground electrodes 4a and 4b from the external circuit.

The conductive film 6 is present not only at the lower sides of the ground electrodes 4a, 4b but also at the lower side of the center electrode 3.

Therefore, the electric line of force 7c indicating the electric field generated between the charge 9a induced on the surface of the LN substrate 1 and the charge 9c induced on the conductive film 6 is uniform in the areas where the optical waveguides 2a and 2b are present, which causes the same refractive index changes, that is the same phase changes for the two optical waveguides 2a and 2b.

Since the intensity modulation according to the phase difference between the lights guided through the two optical waveguides 2a and 2b is generated in the Mach-Zehnder interferometer, even when the lights guided through the two optical waveguides 2a and 2b generate the phase changes with same amount, the wave combining is not influenced.

Further, a charge 9b having a polarity opposite to the polarity of the charge 9c induced on the conductive film 6 is induced on the center electrode 3 formed on the second insulating buffer layer 8c made $SiO_2$ through the external circuit.

An electric line of force 7f due to both the induced charges 9c and 9b is limited between the center electrode 3 and the conductive film 6 and is not across the optical waveguide 2a, which does not influence the optical modulation efficiency.

In FIG. 3, the width of the buffer layer 8c is set to be larger than the width of the center electrode 3, but may be set to be as small as the width of the center electrode 3 and may be set to be larger to reach the edge of at least one of the ground electrodes 4a and 4b or the halfway thereof.

In this manner, also in the optical modulation device according to this third embodiment, the thermal drift of the optical modulation by the pyroelectric effect can be effectively restricted as with the optical modulation devices according to the above first and second embodiments.

Further, in the optical modulation device according to the third embodiment, the center electrode 3 and the conductive film 6 are not in contact so that the center electrode 3 and the ground electrodes 4a, 4b at both sides are electrically separated.

Therefore, it is advantageous that device destruction does not occur and the conductivity of the conductive film 6 has a negligible effect on the electric characteristics as the traveling-wave electrode.

(Fourth Embodiment)

Figure 4:
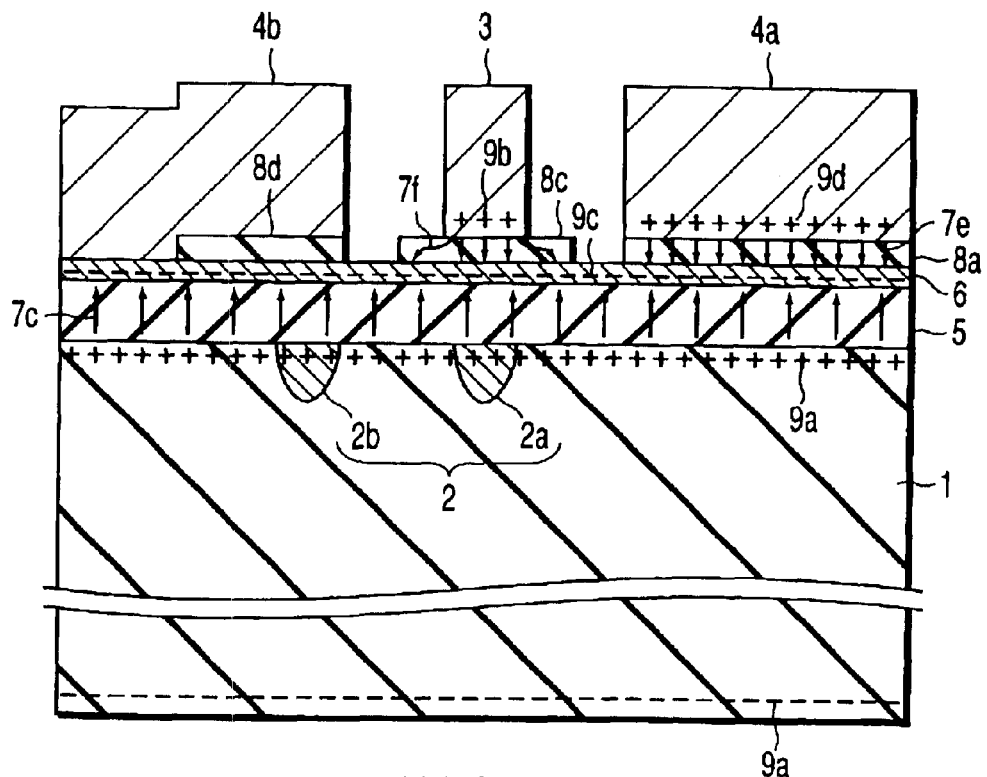
FIG. 4 is a schematic sectional view showing a schematic configuration of an optical modulation device according to a fourth embodiment.

FIG. 4 is a schematic sectional view showing a schematic configuration of an optical modulation device according to a fourth embodiment of the present invention.

In the optical modulation device according to the fourth embodiment shown in FIG. 4, like reference numerals are denoted to like parts identical to those in the optical modulation device according to the third embodiment shown in FIG. 3, and detailed description of the overlapping parts will be omitted.

In the optical modulation device according to this fourth embodiment, of the two ground electrodes 4a and 4b of the traveling-wave electrode, part of the lower surface of the one ground electrode 4b is in contact with the conductive film 6.

In this case, a second buffer layer 8d is intervened between the remaining portion of the lower surface of the one ground electrode 4b and the conductive film 6.

Further, the second buffer layers 8a, 8c, and 8d are intervened between the other ground electrode 4a, the center electrode 3 and the conductive film 6, respectively.

In the optical modulation device according to the fourth embodiment configured in this manner, a charge 9c having a polarity opposite to the polarity of the charge 9a induced on the surface of the LN substrate 1 is induced on the conductive film 6 through the center electrode 3 and the ground electrodes 4a, 4b from the external circuit as with the optical modulation devices according to the above first to third embodiments.

In this manner, also in the present embodiment, the charge 9c is induced on the conductive film 6 so that a sufficient effect can be obtained for restricting the operating point shift caused by the thermal drift.

Further, in the present embodiment, since the center electrode 3 and the conductive film 6 are not in contact so that the center electrode 3 and the ground electrodes 4 are electrically separated completely, it is advantageous that the device destruction does not occur and the conductivity of the conductive film 6 does not easily to affect the electric characteristics of the traveling-wave electrode.

With respect to the ground electrode 4b in contact with the conductive film 6, not part of the lower surface but the whole thereof may be in contact with the conductive film 6, and also with respect to the other ground electrode 4a, part of the lower surface or the whole thereof may be in contact with the conductive film 6.

In the fourth embodiment shown in FIG. 4, the second buffer layers 8c, 8a, and 8d are separated from each other between the center electrode 3 and the two ground electrodes 4a, 4b, but the second buffer layers may be continuously formed between the center electrode 3 and one of the ground electrodes 4a, 4b, or between the center electrode 3 and both the ground electrodes 4a, 4b.

On the contrary, in the optical modulation device according to the fourth embodiment shown in FIG. 4, it goes without saying that the edges of the second buffer layers 8c, 8a, 8d may enter the inside of the edges of the center electrode 3 or the ground electrodes 4a, 4b, respectively.

(Fifth Embodiment)

Figure 5:
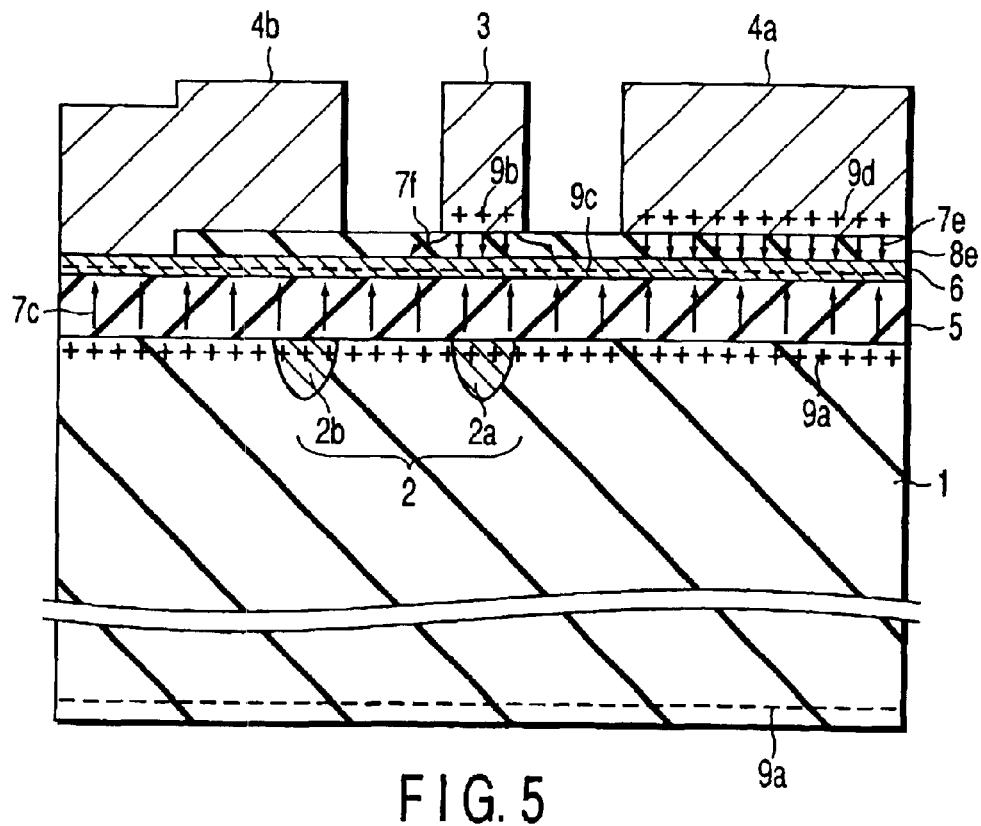
FIG. 5 is a schematic sectional view showing a schematic configuration of an optical modulation device according to a fifth embodiment.

FIG. 5 is a schematic sectional view showing a schematic configuration of an optical modulation device according to a fifth embodiment of the present invention.

In the optical modulation device according to the fifth embodiment shown in FIG. 5, like reference numerals are denoted to like parts identical to those in the optical modulation device according to the fourth embodiment shown in FIG. 4, and a detailed description of the overlapping parts will be omitted.

In the optical modulation device according to this fifth embodiment, the three second buffer layers 8a, 8c, and 8d independently formed on the conductive film 6 in the optical modulation device according to the fourth embodiment shown in FIG. 4 are combined into one second buffer layer 8e.

Also in the optical modulation device according to the fifth embodiment configured in this manner, operation effects substantially identical to those of the optical modulation device according to the fourth embodiment shown in FIG. 4 can be obtained.

(Sixth Embodiment)

Figure 6:
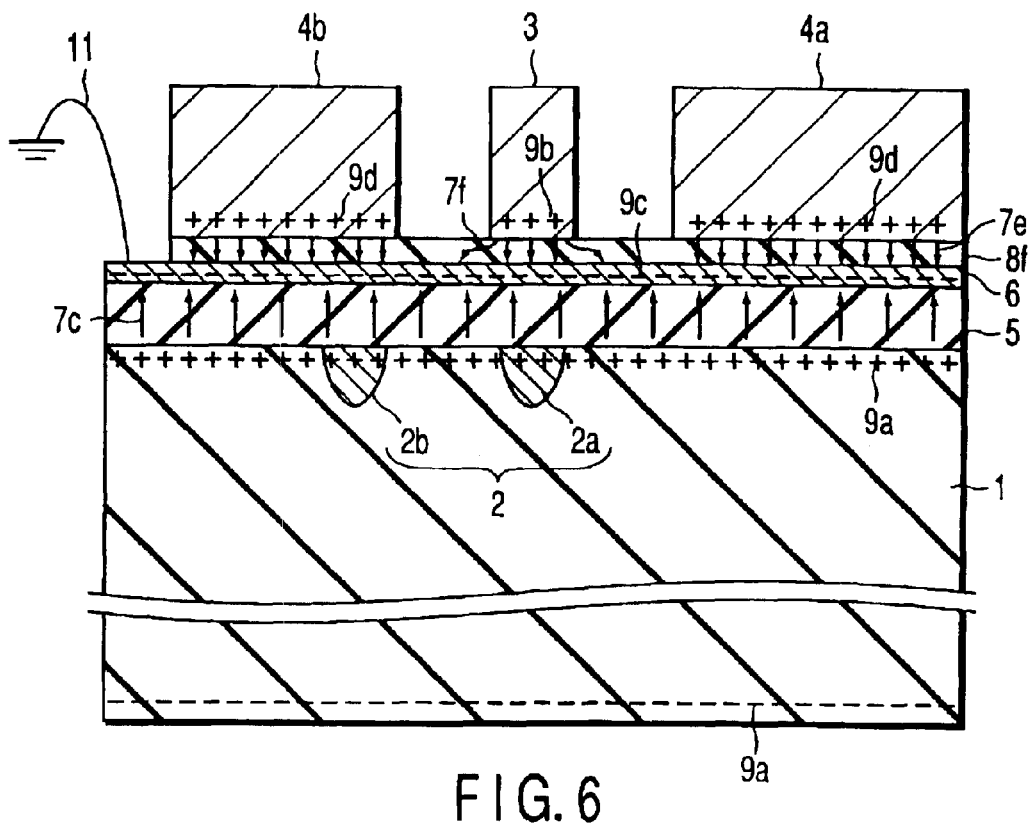
FIG. 6 is a schematic sectional view showing a schematic configuration of an optical modulation device according to a sixth embodiment.

FIG. 6 is a schematic sectional view showing a schematic configuration of an optical modulation device according to a sixth embodiment of the present invention.

In the optical modulation device according to the sixth embodiment shown in FIG. 6, like reference numerals are denoted to like parts identical to those in the optical modulation device according to the fifth embodiment shown in FIG. 5, and detailed description of the overlapping parts will be omitted.

In the optical modulation device according to this sixth embodiment, one common second buffer layer 8f is formed on the conductive film 6 formed on the upper side of the buffer layer 5.

The center electrode 3 and the ground electrodes 4a, 4b are formed on the upper side of this common second buffer layer 8e.

Further, in this sixth embodiment, the conductive film 6 is connected to a casing which covers this optical modulation device via a gold ribbon 11.

In the optical modulation device according to the sixth embodiment configured in this manner, the center electrode 3 and the respective ground electrodes 4a, 4b are not directly in contact with the conductive film 6.

But the conductive film 6 is connected to the casing.

Since the ground electrodes 4a and 4b are generally connected to the casing, the ground electrodes 4a, 4b and the conductive film 6 are grounded at the same potential.

In addition, it goes without saying that there is taken the means where the ground electrodes 4a, 4b are connected to the casing and the conductive film 6 is connected to an external electrode having any potential so that the potential difference is given between the ground electrodes 4a, 4b and the conductive film 6.

In this sixth embodiment, since a charge having a polarity opposite to that of the charge induced on the surface of the LN substrate 1 may be induced on the conductive film 6, it is good enough if the conductive film 6 is electrically connected to any external circuit capable of supplying the charge.

Further, portions between the center electrode 3 and the ground electrodes 4a, 4b of the second buffer layer 8f may be removed.

Therefore, also in the optical modulation device according to the sixth embodiment configured in this manner, the operation effects substantially identical to those in each optical modulation device according to the above third to fifth embodiments can be obtained.

(Seventh Embodiment)

Figure 7:
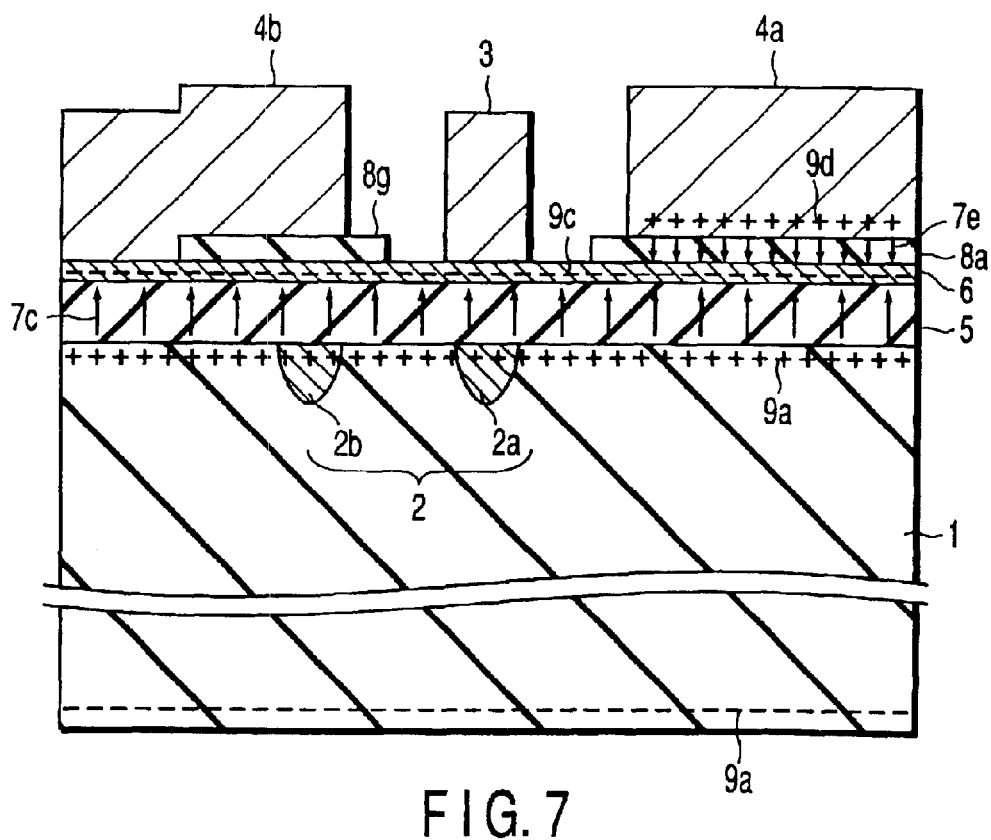
FIG. 7 is a schematic sectional view showing a schematic configuration of an optical modulation device according to a seventh embodiment.

FIG. 7 is a schematic sectional view showing a schematic configuration of an optical modulation device according to a seventh embodiment of the present invention.

In the optical modulation device according to the seventh embodiment shown in FIG. 7, like reference numerals are denoted to like parts identical to those in the optical modulation device according to the first embodiment shown in FIG. 1, and detailed description of the overlapping parts will be omitted.

In the optical modulation device according to this seventh embodiment, the center electrode 3 is directly formed on the center position in the upper surface of the conductive film 6 formed on the upper side of the buffer layer 5, and the second buffer layers 8a and 8g are formed at both sides of the upper surface of the conductive film 6, respectively.

The one ground electrode 4a is formed on the upper side of the one second buffer layer 8a, and the other ground electrode 4b is formed on part of the upper surface of the other second buffer layer 8g.

In other words, part of the lower surface of the other ground electrode 4b is directly in contact with the conductive film 6.

In the optical modulation device according to the seventh embodiment configured in this manner, the operating point shift caused by the thermal drift can be restricted as with the optical modulation devices according to the above first to sixth embodiments.

As with the conventional optical modulation device shown in FIG. 22, it is expected that, when the conductivity of the conductive film 6 is large, the electrical resistance between the ground electrodes 4a, 4b and the center electrode 3 in contact with the conductive film 6 becomes smaller, which affects the electric characteristics.

Therefore, the optical modulation device according to the seventh embodiment is not as effective for the stability of the electric characteristics of the traveling-wave electrode as in the aforementioned first to sixth embodiments.

However, in the optical modulation device according to this seventh embodiment, since the one ground electrode 4a is not in contact with the conductive film 6, the electric adverse effect given by the conductive film 6 to the traveling-wave electrode formed of the center electrode 3 and the ground electrodes 4a, 4b can be restricted as compared with the conventional optical modulation device shown in FIG. 22.

Further, the optical modulation device according to the present invention is advantageous in resisting damage due to Joule heat at the time of voltage applying, as compared with the conventional optical modulation device shown in FIG. 22.

Here, in the seventh embodiment shown in FIG. 7, there will be considered a case where the second buffer layer 8g is not present under the one ground electrode 4b and the entire lower surface of the one ground electrode 4b is in contact with the conductive film 6.

If the DC resistance between the center electrode 3 and the ground electrode 4b is expressed by R and the DC resistance between the center electrode 3 and the ground electrode 4a is expressed by R', the combined DC resistance between the center electrode 3 and the ground electrodes 4a, 4b is R'>>R so that $$Rt = R \cdot R' / (R + R') \quad (1)$$
$$= R$$

is obtained.

On the other hand, in the conventional optical modulation device shown in FIG. 22, $$Rt = R \cdot R / (R + R) \quad (2)$$
$$= R/2$$

is obtained.

Joule heat P generated when the voltage V is applied between the center electrode 3 and the ground electrodes 4a, 4b is expressed as:

$$P = V^2 / Rt \quad (3)$$

Therefore, like the optical modulation device according to the present embodiment, even when the center electrode 3 and the ground electrode 4b are in contact, only half the amount of Joule heat is generated in the present invention as compared with the conventional optical modulation device shown in FIG. 22.

In this manner, that the generated Joule heat is small means that the device is not easily destroyed, and it can be seen that, even when one ground electrode is in contact with the conductive film 6, the optical modulation device according to the present invention is effective.

As can be understood from the respective optical modulation devices according to the first to seventh embodiments described above, the conductive film 6 on which the charge 9c having the polarity opposite to the polarity of the charge 9a induced on the surface of the LN substrate 1 by the pyroelectric effect is induced is formed on the lower areas of the ground electrodes 4a and 4b and the electric field caused by the induced charge becomes uniform over a wide range. Accordingly, the effect for the thermal drift restriction is remarkable as compared with the conventional optical modulation device shown in FIG. 23.

Further, in the conventional optical modulation device shown in FIG. 22, both the center electrode 3 and the ground electrodes 4a, 4b are in contact with the conductive film 6 so that the conductivity of the conductive film 6 largely influences the electric characteristics as the traveling-wave electrode.

However, in the optical modulation device according to each embodiment of the present invention, the center electrode 3 and the ground electrodes 4a, 4b are completely electrically separated.

Alternatively, in the case where a plurality of ground electrodes 4a, 4b are present, at least one ground electrode (4a or 4b) is electrically separated from the center electrode 3 completely.

Therefore, in the optical modulation device according to each embodiment of the present invention, it is advantageous that, even when the conductivity of the conductive film 6 becomes higher, the device destruction does not occur and the conductivity of the conductive film 6 does not easily to affect the electric characteristics as the traveling-wave electrode as compared with the conventional optical modulation device shown in FIG. 22.

(Eighth Embodiment)

Figure 8:
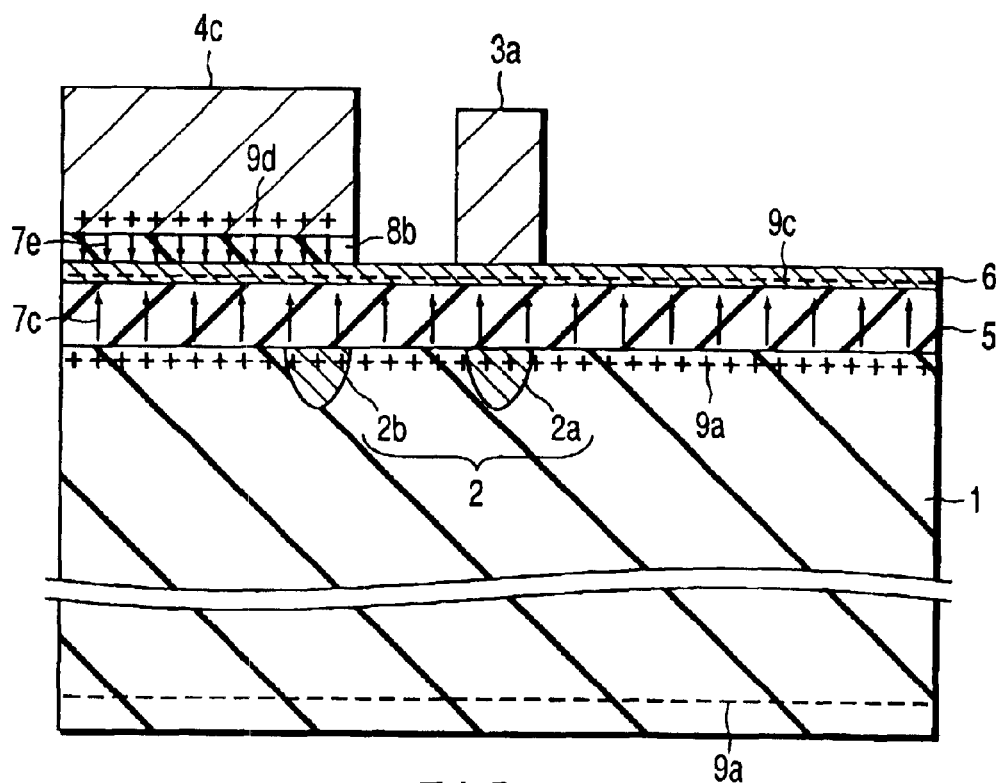
FIG. 8 is a schematic sectional view showing a schematic configuration of an optical modulation device according to a eighth embodiment.

FIG. 8 is a schematic sectional view showing a schematic configuration of an optical modulation device employing a traveling-wave electrode of asymmetrical coplanar strip (ACPS) structure according to an eighth embodiment of the preset invention.

In the optical modulation device according to the eighth embodiment shown in FIG. 8, like reference numerals are denoted to like parts identical to those in the optical modulation device according to the first embodiment shown in FIG. 1, and detailed description of the overlapping parts will be omitted.

As shown in FIG. 8, the optical modulation device according to this eighth embodiment is applied as the asymmetrical coplanar strip (ACPS) formed of one center electrode 3a and one ground electrode 4c.

As can be seen from FIG. 8, the center electrode 3a is in contact with the conductive film 6.

Reference numeral 8b indicates the second buffer layer.

In this manner, also in the optical modulation device employing the traveling-wave electrode of an asymmetrical coplanar strip (ACPS) structure according to the eighth embodiment, the operating point shift caused by the thermal drift can be restricted as with the optical modulation device according to each of the first to seventh embodiments described above.

(Ninth Embodiment)

Figure 9:
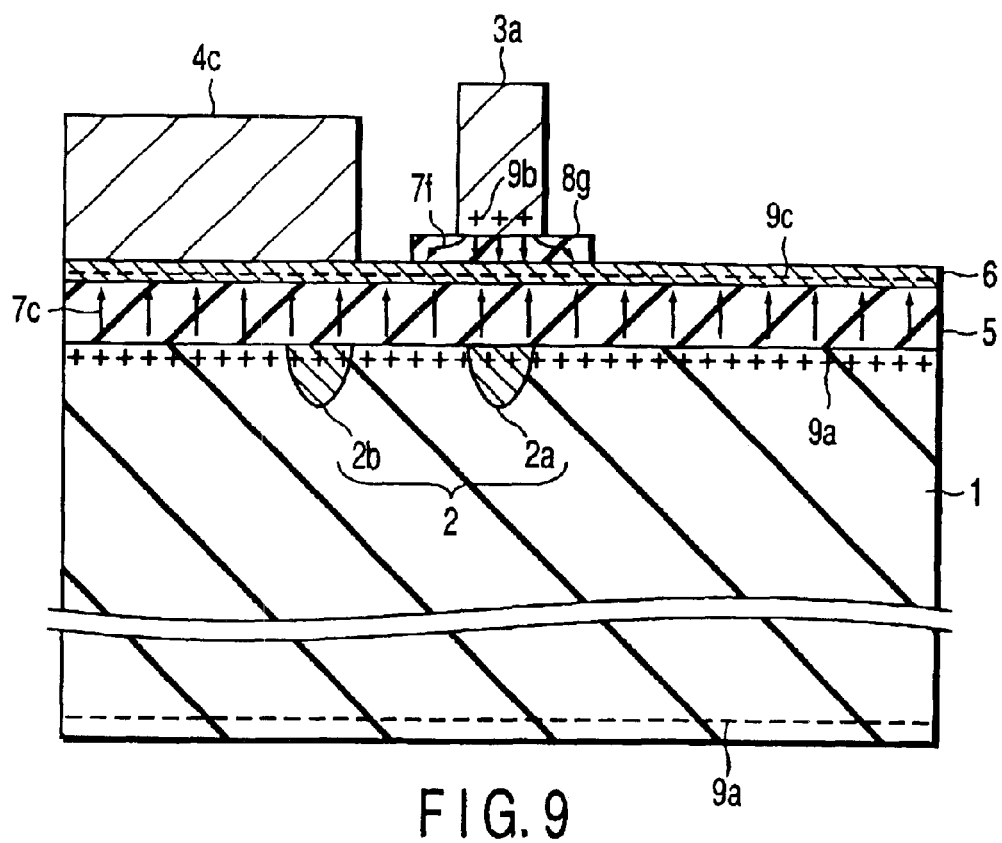
FIG. 9 is a schematic sectional view showing a schematic configuration of an optical modulation device according to a ninth embodiment.

FIG. 9 is a schematic sectional view showing a schematic configuration of an optical modulation device employing a traveling-wave electrode of an asymmetrical coplanar strip (ACPS) structure according to a ninth embodiment of the preset invention.

In the optical modulation device according to the ninth embodiment shown in FIG. 9, like reference numerals are denoted to like parts identical to those in the optical modulation device according to the first embodiment shown in FIG. 1, and detailed description of the overlapping parts will be omitted.

As shown in FIG. 9, the optical modulation device according to this ninth embodiment is applied as the asymmetrical coplanar strip (ACPS) formed of one center electrode 3a and one ground electrode 4c.

As can be seen from FIG. 9, the ground electrode 4c is in contact with the conductive film 6.

Reference numeral 8g indicates the second buffer layer.

In this manner, also in the optical modulation device employing the traveling-wave electrode of asymmetrical coplanar strip (ACPS) structure according to the eighth embodiment, the operating point shift caused by the thermal drift can be restricted as with the optical modulation device according to each of the first to seventh embodiments described above.

Like the optical modulation devices according to the eighth embodiment shown in FIG. 8 and the ninth embodiment shown in FIG. 9, also when the present invention is applied to ACPS, it is advantageous that one of the center electrode 3a and the ground electrode 4c is not in contact with the conductive film 6 so that, even when the conductivity of the conductive film 6 is high, the center electrode 3a and the ground electrode 4c are not electrically short-circuited, and this makes it very unlikely that the device will be destroyed.

Furthermore, the present invention can be applied to the traveling-wave electrode of a so-called push-pull structure where the center electrode of two CPW or two ACPS is set to each of the two optical waveguides 2a and 2b constructing the optical waveguide of the Mach-Zehnder interferometer.

(Tenth Embodiment)

FIG. 10 is a schematic sectional view showing a schematic configuration of an optical modulation device employing a traveling-wave electrode of push-pull structure according to a tenth embodiment of the present invention.

In the optical modulation device according to the tenth embodiment shown in FIG. 10, like reference numerals are denoted to like parts identical to those in the optical modulation device according to the first embodiment shown in FIG. 1, and detailed description of the overlapping parts are omitted.

As shown in FIG. 10, in the optical modulation device according to this tenth embodiment, two center electrodes 3b, 3c and three ground electrodes 4d, 4e, 4f are provided.

In the optical modulation device according to this tenth embodiment, the two center electrodes 3b and 3c are in contact with the conductive film 6.

Reference numerals 8a, 8b, and 8h indicate the second buffer layer.

Also in the optical modulation device employing the traveling-wave electrode of push-pull structure according to the tenth embodiment, the operating point shift caused by the thermal drift can be restricted as with the optical modulation device according to each of the above first to seventh embodiments.

(Eleventh Embodiment)

FIG. 11 is a schematic sectional view showing a schematic configuration of an optical modulation device employing a traveling-wave electrode of a push-pull structure according to an eleventh embodiment of the present invention.

In the optical modulation device according to the eleventh embodiment shown in FIG. 11, like reference numerals are denoted to like parts identical to those in the optical modulation device according to the first embodiment shown in FIG. 1, and detailed description of the overlapping parts will be omitted.

As shown in FIG. 11, in the optical modulation device according to this eleventh embodiment, the two center electrodes $3b$, $3c$ and the three ground electrodes $4d$, $4e$, $4f$ are provided.

In the optical modulation device according to this eleventh embodiment, the three ground electrodes $4d$, $4e$, and $4f$ are in contact with the conductive film 6.

Reference numerals $8a$, $8i$, and $8j$ indicate the second buffer layer.

Also in the optical modulation device employing the traveling-wave electrode of push-pull structure according to the eleventh embodiment, the operating point shift caused by the thermal drift can be restricted as with the optical modulation devices according to the above first to seventh embodiments.

(Twelfth Embodiment)

Figure 12:
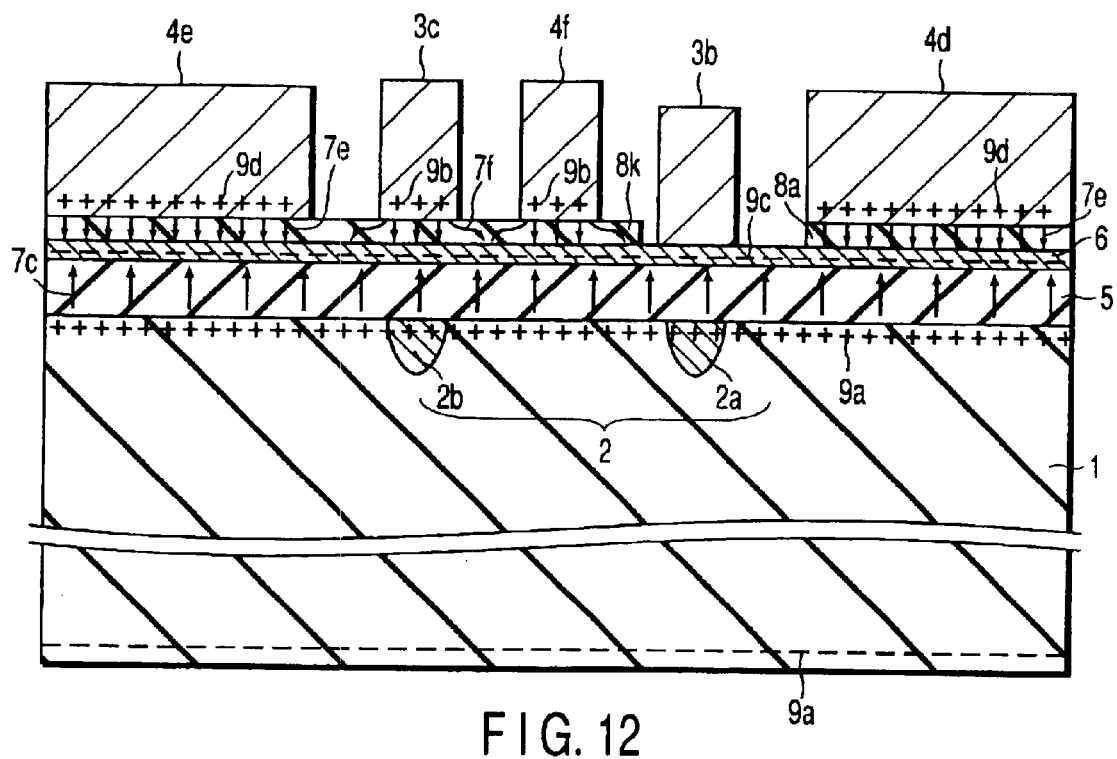
FIG. 12 is a schematic sectional view showing a schematic configuration of an optical modulation device according to a twelfth embodiment.

FIG. 12 is a schematic sectional view showing a schematic configuration of an optical modulation device employing a traveling-wave electrode of push-pull structure according to a twelfth embodiment of the present invention.

In the optical modulation device according to the twelfth embodiment shown in FIG. 12, like reference numerals are denoted to like parts identical to those in the optical modulation device according to the first embodiment shown in FIG. 1, and a detailed description of the overlapping parts will be omitted.

As shown in FIG. 12, in the optical modulation device according to this twelfth embodiment, the two center electrodes $3b$, $3c$ and the three ground electrodes $4d$, $4e$, $4f$ are provided.

In the optical modulation device according to this twelfth embodiment, only one center electrode $3b$ is in contact with the conductive film 6.

Reference numerals $8a$ and $8k$ indicate the second buffer layer.

Also in the optical modulation device employing the traveling-wave electrode of a push-pull structure according to the twelfth embodiment, the operating point shift caused by the thermal drift can be restricted as with the optical modulation devices according to the above first to seventh embodiments.

(Thirteenth Embodiment)

Figure 13:
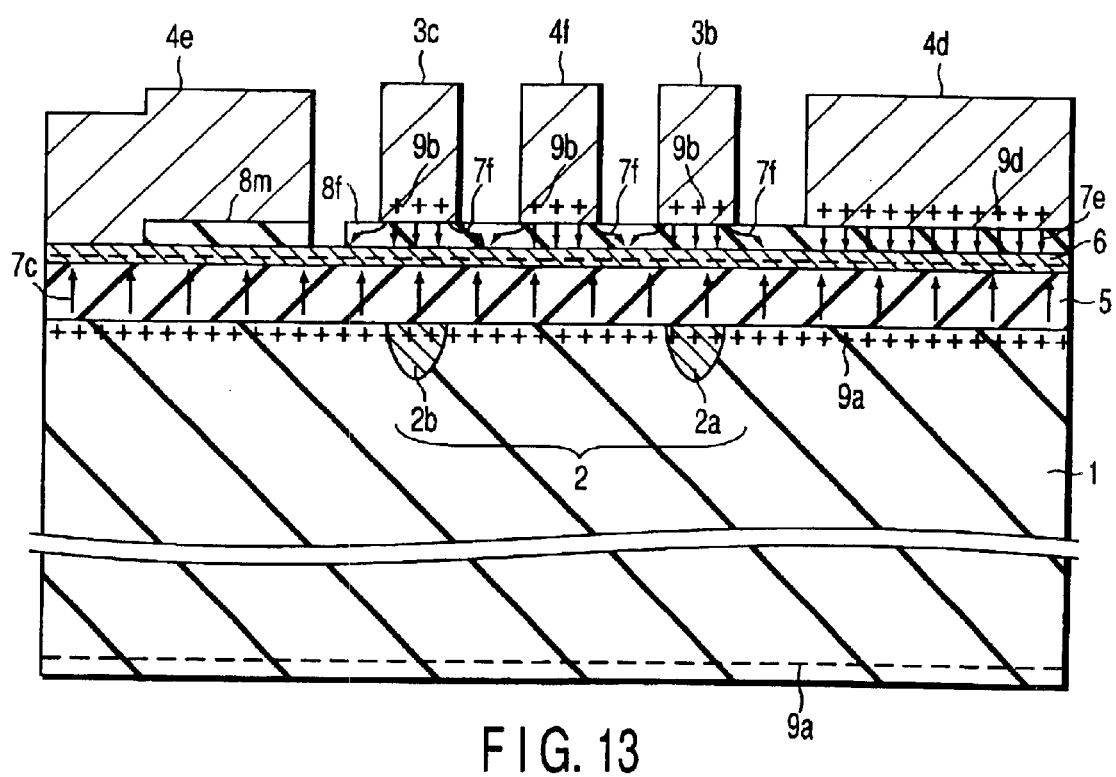
FIG. 13 is a schematic sectional view showing a schematic configuration of an optical modulation device according to a thirteenth embodiment.

FIG. 13 is a schematic sectional view showing a schematic configuration of an optical modulation device employing a traveling-wave electrode of push-pull structure according to a thirteenth embodiment of the present invention.

In the optical modulation device according to the thirteenth embodiment shown in FIG. 13, like reference numerals are denoted to like parts identical to those in the optical modulation device according to the first embodiment shown in FIG. 1, and a detailed description of the overlapping parts will be omitted.

As shown in FIG. 13, in the optical modulation device according to this thirteenth embodiment, the two center electrodes $3b$, $3c$ and the three ground electrodes $4d$, $4e$, $4f$ are provided.

In the optical modulation device according to this thirteenth embodiment, part of one ground electrode $4e$ is in contact with the conductive film 6.

In addition, it goes without saying that the entire lower surface of the ground electrode $4e$ may be in contact with the conductive film 6.

Reference numerals $8f$ and $8m$ indicate the second buffer layer.

Also in the optical modulation device employing the traveling-wave electrode of a push-pull structure according to the thirteenth embodiment, the operating point shift caused by the thermal drift can be restricted as with the optical modulation devices according to the above first to seventh embodiments.

In addition, when the present invention is applied to the push-pull type CPW, it is ideally desirable that the center electrode and the ground electrodes are electrically separated from each other via the second buffer layers.

As far as this condition is satisfied, it goes without saying that the way a plurality of center electrodes and a plurality of ground electrodes are made to contact the conductive layer 6 has various combinations other than those shown in FIG. 8 to FIG. 13.

Furthermore, as with the seventh embodiment shown in FIG. 7, a configuration can be employed in which at least one center electrode or ground electrode is electrically separated via the second buffer.

The optical modulation device according to the present invention configured in this manner is also more advantageous than the conventional optical modulation device where all the center electrodes and the ground electrodes are in contact with the conductive film 6, from the viewpoint of the high frequency characteristics and Joule heat generated when the voltage is applied.

The push-pull type ACPS is the case where the ground electrode $4f$ between the two center electrodes $3a$ and $3b$ in the push-pull type CPW is omitted, and it goes without saying that the present invention can be also applied to the push-pull type ACPS.

In this manner, also when the present invention is applied to the push-pull type ACPS, various choices are present for selecting the center electrodes and the ground electrodes in contact with the conductive film 6.

Furthermore, like the sixth embodiment shown in FIG. 6, with respect to the push-pull type CPW and the push-pull type ACPS, it goes without saying that the conductive film 6 may be connected or grounded to the external circuit and the center electrodes or the ground electrodes may not be in contact (or may be partially in contact) with the conductive film 6.

Hereinafter, the embodiments according to the present invention applied to the push-pull type ACPS will be described.

(Fourteenth Embodiment)

Figure 14:
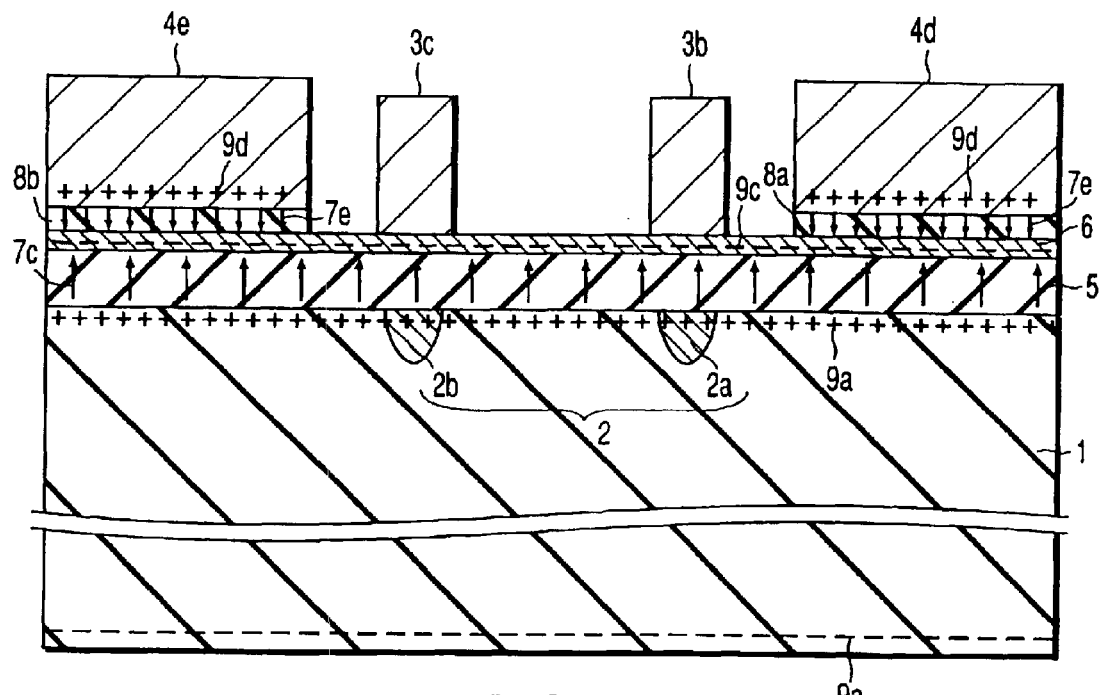
FIG. 14 is a schematic sectional view showing a schematic configuration of an optical modulation device according to a fourteenth embodiment.

FIG. 14 is a schematic sectional view showing a schematic configuration of an optical modulation device according to a fourteenth embodiment of the present invention applied to the push-pull type ACPS.

In the optical modulation device according to the fourteenth embodiment shown in FIG. 14, like reference numerals are denoted to like parts identical to those in the optical modulation device according to the tenth embodiment shown in FIG. 10, and a detailed description of the overlapping parts will be omitted.

As shown in FIG. 14, in the optical modulation device according to this fourteenth embodiment, the two center electrodes $3b$, $3c$ and the two ground electrodes $4d$, $4e$ are provided.

In the optical modulation device according to this fourteenth embodiment, the two center electrodes 3b and 3c are in contact with the conductive film 6.

Reference numerals 8a and 8b indicate the second buffer layer.

Also in the optical modulation device according to the fourteenth embodiment applied to the push-pull type ACPS in this manner, the operating point shift caused by the thermal drift can be restricted as with the optical modulation devices according to the above first to seventh embodiments.

(Fifteenth Embodiment)

Figure 15:
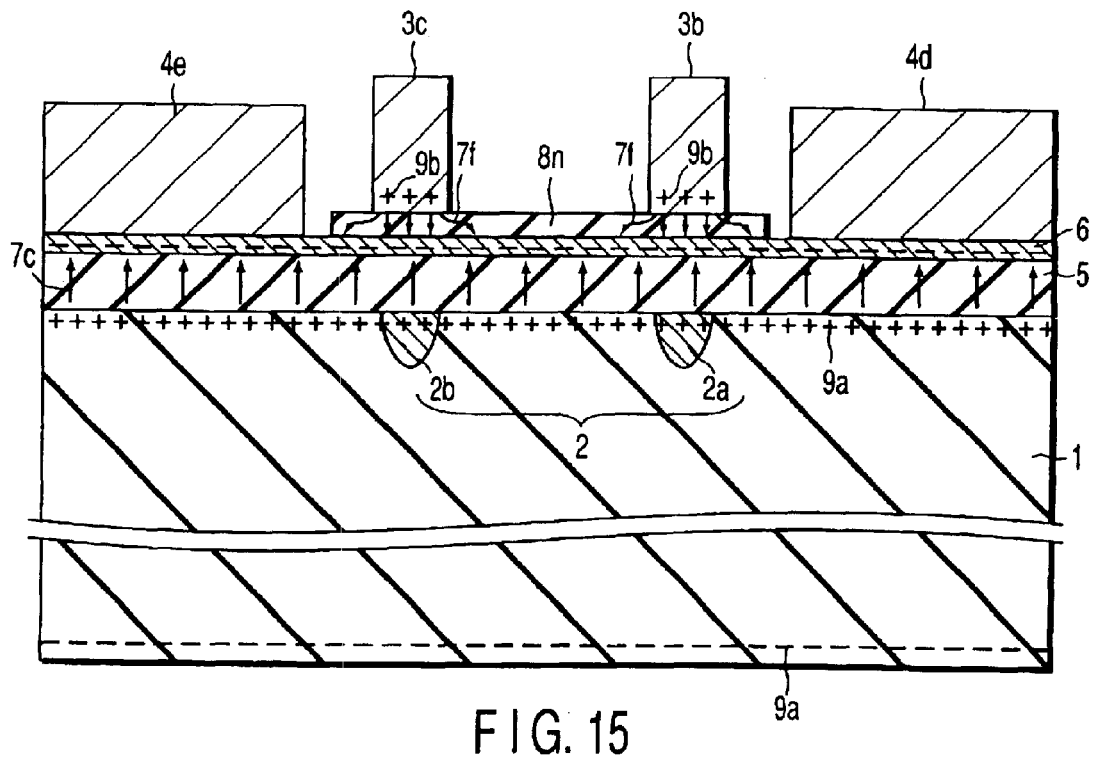
FIG. 15 is a schematic sectional view showing a schematic configuration of an optical modulation device according to a fifteenth embodiment.

FIG. 15 is a schematic sectional view showing a schematic configuration of an optical modulation device according to a fifteenth embodiment of the present invention applied to the push-pull type ACPS.

In the optical modulation device according to the fifteenth embodiment shown in FIG. 15, like reference numerals are denoted to like parts identical to those in the optical modulation device according to the eleventh embodiment shown in FIG. 11, and a detailed description of the overlapping parts will be omitted.

As shown in FIG. 15, in the optical modulation device according to this fifteenth embodiment, the two center electrodes 3b, 3c and the two ground electrodes 4d, 4e are provided.

In the optical modulation device according to this fifteenth embodiment, the two ground electrodes 4d and 4e are in contact with the conductive film 6.

Reference numeral 8n indicates the second buffer layer.

Also in the optical modulation device according to the fifteenth embodiment applied to the push-pull type ACPS in this manner, the operating point shift caused by the thermal drift can be restricted as with the optical modulation devices according to the above first to seventh embodiments.

(Sixteenth Embodiment)

Figure 16:
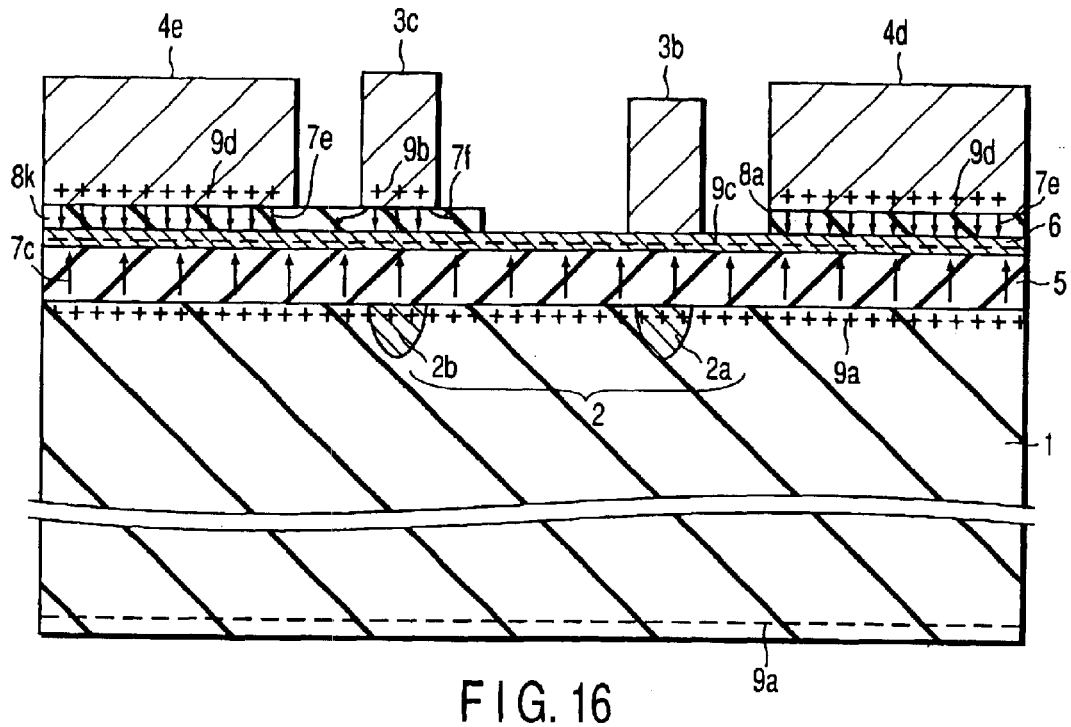
FIG. 16 is a schematic sectional view showing a schematic configuration of an optical modulation device according to a sixteenth embodiment.

FIG. 16 is a schematic sectional view showing a schematic configuration of an optical modulation device according to a sixteenth embodiment of the present invention applied to the push-pull type ACPS.

In the optical modulation device according to the sixteenth embodiment shown in FIG. 16, like reference numerals are denoted to like parts identical to those in the optical modulation device according to the twelfth embodiment shown in FIG. 12, and a detailed description of the overlapping parts will be omitted.

As shown in FIG. 16, in the optical modulation device according to this sixteenth embodiment, the two center electrodes 3b, 3c and the two ground electrodes 4d, 4e are provided.

In the optical modulation device according to this sixteenth embodiment, only one center electrode 3b is in contact with the conductive film 6.

Reference numerals 8a and 8k indicate the second buffer layer.

Also in the optical modulation device according to the sixteenth embodiment applied to the push-pull type ACPS in this manner, the operating point shift caused by the thermal drift can be restricted as with the optical modulation devices according to the above first to seventh embodiments.

(Seventeenth Embodiment)

Figure 17:
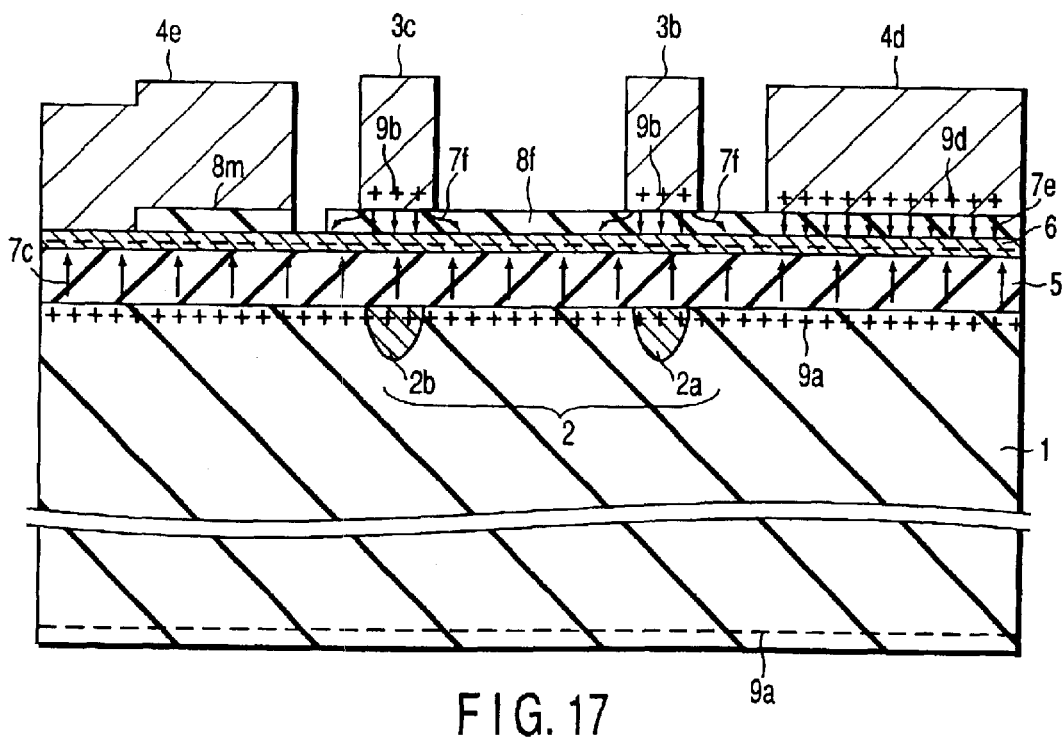
FIG. 17 is a schematic sectional view showing a schematic configuration of an optical modulation device according to a seventeenth embodiment.

FIG. 17 is a schematic sectional view showing a schematic configuration of an optical modulation device according to a seventeenth embodiment of the present invention applied to the push-pull type ACPS.

In the optical modulation device according to the seventeenth embodiment shown in FIG. 17, like reference numerals are denoted to like parts identical to those in the optical modulation device according to the thirteenth embodiment shown in FIG. 13, and a detailed description of the overlapping parts will be omitted.

As shown in FIG. 17, in the optical modulation device according to this seventeenth embodiment, the two center electrodes 3b, 3c and the two ground electrodes 4d, 4e are provided.

In the optical modulation device according to this seventeenth embodiment, part of one ground electrode 4e is in contact with the conductive film 6.

In addition, it goes without saying that the entire lower surface of the ground electrode 4e may be in contact with the conductive film 6.

Reference numerals 8f and 8m indicate the second buffer layer.

Also in the optical modulation device according to the seventeenth embodiment applied to the push-pull type ACPS in this manner, the operating point shift caused by the thermal drift can be restricted as with the optical modulation devices according to the above first to seventh embodiments.

Further, the principle for eliminating the operating point shift caused by the pyroelectric effect according to the present invention does not depend on the electrode structure so that the present invention can be applied not only to the traveling-wave electrode but also to a lumped-element type electrode.

In the above description for each embodiment according to the present invention, the $SiO_2$ film is assumed as the second buffer layers 8a, 8b, . . . , 8g for electric insulation, but not only this but also any other materials such as SiNx, $TiO_2$, $Al_2O_3$, polyimide, BCB (trademark), and the like may be employed.

Further, Si is assumed as the material of the conductive film 6, but any materials having the conductivity to a certain extent such as $SiO_2$, ITO (trademark), and the like may be employed.

Furthermore, the thickness of the buffer layer 5 in contact with the LN substrate 1, the thickness of the conductive film 6, and the thickness of the second buffer layer 8a, 8b, . . . , 8g in contact with the center electrode 3 or the ground electrode 4a, 4b are within the ranges on the order of several hundreds nm to 2 μm, 5 nm to 2 μm, and several hundreds nm to 2 μm, respectively, and various combination thereof are present.

However, in order that the drive voltage of the optical modulation applied between the center electrode 3 and the ground electrodes 4a, 4b does not become too high, it is more suitable that the thickness of the buffer layers 5, 8a, 8b, . . . , 8g positioned above and below the conductive film 6 and the thickness of the conductive film 6 are set to be 2 μm or less in total.

In the above description in each embodiment, the thickness of the conductive film 6 which is assumed to be 100 nm depends on the magnitude of the conductivity, but it is confirmed that the thickness can be further made larger to several hundreds nm.

The thickness of the conductive film 6 is increased in this manner so that the conductive film can be uniformly formed.

In addition, the thickness of the conductive film 6 may be smaller than 100 nm as far as the continuity of the film can be secured.

Further, in the optical modulation device according to each embodiment of the present invention shown here, the conductive film 6 is formed over the whole on the buffer layer 5. However, it is not required that the conductive film 6 is formed over the whole on the buffer layer 5 as far as the condition that the electric fields applied on the optical waveguides 2a and 2b do not cause the thermal drift is satisfied.

Moreover, the description is made by using the CPW in which one center electrode 3 and two ground electrodes 4a, 4b are present as a structure of the traveling-wave electrode, but it is possible to employ the traveling-wave electrode having any form such as the asymmetrical coplanar strip (ACPS) in which one center electrode and one ground electrode are present, an electrode having a three-electrode structure in which one center electrode and two narrow ground conductors are present, and the like.

In all the embodiments according to the present invention, the conductive film 6 is covered with the second buffer layers in order that the conductive film 6 is not in contact with air, so that it is possible to prevent vapor being deposited on the conductive film 6.

In this case, the gap between the center electrode of the optical modulation device and the ground electrode is as small as 10 μm to 30 μm and the voltage of 5 V to 100 V is applied to this gap so that the high electric field is present in this gap.

Therefore, when the vapor is deposited on the conductive film 6, a leak current is generated in this gap, but this can be avoided.

Furthermore, in each embodiment, description is made on the assumption of the z-cut LN substrate 1, but it goes without saying that the LN substrate 1 having another crystal orientation of x-cut, y-cur, or the like may be employed and another substrate having the electro-optic effect such as lithium tantalate or the like may be employed.

Additionally, in each embodiment, the description is made exemplifying the optical modulation device as represented by the intensity modulation device using the optical waveguide of the Mach-Zehnder interferometer, but a directional coupler may be employed instead of the Mach-Zehnder type optical waveguide, and the optical waveguide having another structure may be employed.

Further, it goes without saying that the above can be applied to an LN optical modulation device having a ridge structure proposed for high speed and low voltage (Japanese Patent No. 2728150).

In addition, the above can be applied not only to the intensity modulation device but also to various optical modulation devices, such as a phase modulation device, a polarization scrambler, and the like manufactured using the substrate having the electro-optic effect.

As described above, in the optical modulation device according to the present invention, the center electrode and the ground electrode are electrically separated using the conductive film.

Thereby, the charge having the polarity opposite to the polarity of the charge induced on the surface of the substrate by the pyroelectric effect is induced on the conductive film from the external circuit via the traveling-wave electrode when the temperature is changed. Therefore, the electric field by the induced charges becomes uniform in the areas where the optical waveguides are present and the operating point shift caused by the thermal drift can be finally restricted without influencing the optical modulation.

Furthermore, since the center electrode and the ground electrodes constructing the traveling-wave electrode are electrically separated, even when the conductivity of the conductive film for restricting the thermal drift caused by the pyroelectric effect becomes higher, device destruction does not occur and excellent electric characteristics, including high frequency characteristics, can be attained.

Accordingly, as described above in detail, according to the present invention, it is possible to provide a small-sized and high-speed optical modulation device in which a conductive film is employed and a center electrode and a ground electrode are electrically separated so that an electrical resistance between the center electrode and the ground electrode is made larger, device destruction is avoided and excellent high frequency characteristics are attained, facilitation of structure determination or manufacturing process or reproducibility of manufacture is secure, and further a thermal drift is effectively restricted also for a traveling-wave electrode (center electrode and ground electrode) having the thickness of 20 μm or more generally required, and as a result, an operating point shift caused by the thermal drift is small.

Further, according to the present invention, it is possible to provide a method for manufacturing a small-sized and high-speed optical modulation device in which a conductive film is employed and a center electrode and a ground electrode are electrically separated so that an electrical resistance between the center electrode and the ground electrode is made larger, a device destruction is avoided and excellent high frequency characteristics are satisfied, facilitation of structure determination or manufacturing process or reproducibility of manufacture is secure, and further a thermal drift is effectively restricted also for a traveling-wave electrode (center electrode and ground electrode) having the thickness of 20 μm or more generally required, and as a result, an operating point shift caused by the thermal drift is small.

What is claimed is:

1. An optical modulation device comprising:
   a substrate having an electro-optic effect;
   an optical waveguide which is formed on the substrate and guides an incident light;
   a first buffer layer which covers an upper surface of the substrate;
   a conductive film formed above the first buffer layer;
   a center electrode and a ground electrode to apply a voltage in order to induce an electric field on the optical waveguide; and
   a second buffer layer formed between the conductive film and at least one of the center electrode and the ground electrode,
   wherein the conductive film is formed to be present on at least a part below the ground electrode, and
   a light guided through the optical waveguide is modulated by changing a phase by a voltage applied to the optical waveguide.

2. An optical modulation device according to claim 1, wherein the center electrode is in contact with the conductive film and the ground electrode is not in contact with the conductive film.

3. An optical modulation device according to claim 2, wherein a second buffer layer is formed between the ground electrode and the conductive film.

4. An optical modulation device according to claim 1, wherein a second buffer layer is formed between the ground ectrode and the conductive film.

5. An optical modulation device according to claim 1, wherein the ground electrode is in contact with the conductive film and the center electrode is not in contact with the conductive film.

6. An optical modulation device according to claim 5, wherein a second buffer layer is formed between the center electrode and the conductive film.

7. An optical modulation device according to claim 1, wherein a second buffer layer is formed between the center electrode and the conductive film.

8. An optical modulation device according to claim 1, wherein the center electrode includes a plurality of center electrode members, at least one of the plurality of center electrode members is in contact with the conductive film, and the ground electrode is not in contact with the conductive film.

9. An optical modulation device according to claim 1, wherein the center electrode includes a plurality of center electrode members, all the plurality of center electrode members are in contact with the conductive film, and the ground electrode is not in contact with the conductive film.

10. An optical modulation device according to claim 9, wherein a second buffer layer is formed between the ground electrode and the conductive film.

11. An optical modulation device according to claim 8, wherein a second buffer layer is formed between the ground electrode and the conductive film.

12. An optical modulation device according to claim 1, wherein the ground electrode includes a plurality of ground electrode members, at least one of the plurality of ground electrode members is in contact with the conductive film, and the center electrode is not in contact with the conductive film.

13. An optical modulation device according to claim 12, wherein a second buffer layer is formed between the center electrode and the conductive film.

14. An optical modulation device according to claim 13, wherein only part of the ground electrode is in contact with the conductive film.

15. An optical modulation device according to claim 1, wherein a second buffer layer is formed between the center electrode, the ground electrode and the conductive film, the center electrode and the ground electrode are not in contact with the conductive film, and part of the conductive film is electrically connected with the outside.

16. An optical modulation device according to claim 15, wherein the center electrode includes a plurality of center electrode members.

17. An optical modulation device according to claim 15, wherein the ground electrode includes a plurality of ground electrode members.

18. An optical modulation device according to claim 1, wherein the center electrode includes a plurality of center electrode members and the ground electrode includes a plurality of ground electrode members, at least one of the plurality of center electrode members is in contact with the conductive film, at least one of the plurality of ground electrode members is in contact with the conductive film, and said at least one of the plurality of center electrodes or said at least one of the plurality of ground electrodes is not in contact with the conductive film.

19. An optical modulation device according to claim 12, wherein only part of the ground electrode is in contact with the conductive film.

20. A method for manufacturing an optical modulation device, comprising:
    providing a substrate having an electro-optic effect;
    forming an optical waveguide which guides an incident light on the substrate;
    forming a first buffer layer which covers an upper surface of the substrate;
    forming a conductive film above the first buffer layer;
    forming a center electrode and a ground electrode which apply a voltage in order to induce an electric field on the optical waveguide; and
    forming a second buffer layer between the conductive film and at least one of the center electrode and the ground electrode,
    wherein the conductive film is formed to be present on at least a part below the ground electrode, and
    a light guided through the optical waveguide is modulated by changing a phase by a voltage applied to the optical waveguide.

* * * * *